United States Patent
Han et al.

(10) Patent No.: US 9,288,798 B2
(45) Date of Patent: Mar. 15, 2016

(54) METHOD AND DEVICE FOR TRANSMITTING CONTROL INFORMATION IN A WIRELESS COMMUNICATION SYSTEM

(75) Inventors: Seunghee Han, Anyang-si (KR); Jinmin Kim, Anyang-si (KR); Hyunwoo Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 320 days.

(21) Appl. No.: 13/883,389

(22) PCT Filed: Nov. 1, 2011

(86) PCT No.: PCT/KR2011/008241
§ 371 (c)(1),
(2), (4) Date: May 3, 2013

(87) PCT Pub. No.: WO2012/060603
PCT Pub. Date: May 10, 2012

(65) Prior Publication Data
US 2013/0223396 A1    Aug. 29, 2013

Related U.S. Application Data

(60) Provisional application No. 61/409,897, filed on Nov. 3, 2010, provisional application No. 61/410,925, filed on Nov. 7, 2010.

(51) Int. Cl.
| | |
|---|---|
| H04W 4/00 | (2009.01) |
| H04W 72/04 | (2009.01) |
| H04L 1/16 | (2006.01) |
| H04L 1/18 | (2006.01) |
| H04L 5/00 | (2006.01) |
| H04L 1/00 | (2006.01) |
| H04W 28/06 | (2009.01) |
| H04W 72/12 | (2009.01) |
| H04L 27/26 | (2006.01) |

(52) U.S. Cl.
CPC ......... *H04W 72/0413* (2013.01); *H04L 1/0073* (2013.01); *H04L 1/1671* (2013.01);
(Continued)

(58) Field of Classification Search
CPC ... H04L 1/1671; H04L 1/1861; H04L 5/0055; H04L 1/0073; H04L 27/2647; H04L 5/001; H04L 27/2636; H04W 72/0413; H04W 28/04; H04W 28/065; H04W 72/1284
See application file for complete search history.

(56) References Cited

U.S. PATENT DOCUMENTS

2010/0165931 A1* 7/2010 Nimbalker et al. ........... 370/329
2011/0013615 A1* 1/2011 Lee et al. ...................... 370/344
(Continued)

OTHER PUBLICATIONS

CMCC et al., "Way Forward on Supporting ACK/NAK Payload Larger than 11 Bits in Rel-10 TDD," TSG-RAN WG 1 Meeting #62bis, Agenda Item 6.2.1, R1-105776, Oct. 11-15, 2010, Xi'an, China, 2 pages.

(Continued)

*Primary Examiner* — Ayaz Sheikh
*Assistant Examiner* — Hai-Chang Hsiung
(74) *Attorney, Agent, or Firm* — Birch, Stewart, Kolasch & Birch, LLP

(57) ABSTRACT

The present invention relates to a wireless communication system. More specifically, a method for transmitting control information including ACK/NACK and a scheduling request (SR) from a terminal in a wireless communication system comprises the steps of: receiving a plurality of physical downlink shared channels (PDSCHs); and transmitting a plurality of ACK/NACK and SR corresponding to the plurality of PDSCHs by using physical uplink control channel (PUCCH) format 3, wherein the plurality of ACK/NACK are divided into first and second segments, and the SR is added to at least one of the first and second segments and is then joint coded with the plurality of ACK/NACKs of the segment to which the SR is added.

8 Claims, 38 Drawing Sheets

(52) U.S. Cl.
CPC ............ *H04L1/1861* (2013.01); *H04L 5/0055* (2013.01); *H04L 5/001* (2013.01); *H04L 27/2636* (2013.01); *H04L 27/2647* (2013.01); *H04W 28/065* (2013.01); *H04W 72/1284* (2013.01)

(56) References Cited

U.S. PATENT DOCUMENTS

| | | | | |
|---|---|---|---|---|
| 2011/0243066 | A1* | 10/2011 | Nayeb Nazar et al. | ....... 370/328 |
| 2012/0210187 | A1* | 8/2012 | Yin | ............ H03M 13/136 714/751 |

OTHER PUBLICATIONS

LG Electronics Inc., "UCI Combination of PUCCH for CA," 3GPP TSG RAN WG 1 #62bis, Agenda Item 6.2.1.3, R1-105649, Oct. 11-15, 2010, Xi'an, China, 13 pages.

Samsung, "Discussion on Concurrent Transmission of SRI and CA ACK/NACK Information for LTE-Advanced," 3GPP TSG RAN WG 1 #62bis, Agenda Item 6.2.1.3, R1-105366, Oct. 11-15, 2010, Xi'an, China, 7 pages.

Texas Instruments, "Multiplexing SR and HARQ-ACK Feedback on PUCCH," 3GPP TSG RAN WG1 #62bis, Agenda Item 6.2.1.1, R1-105702, Oct. 11-15, 2010, Xi'an, China, 4 pages.

* cited by examiner

FIG. 6
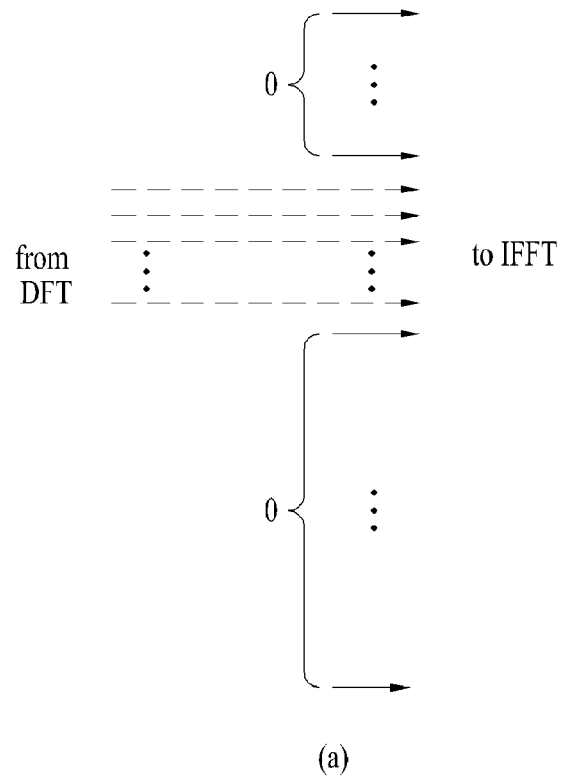
(a)
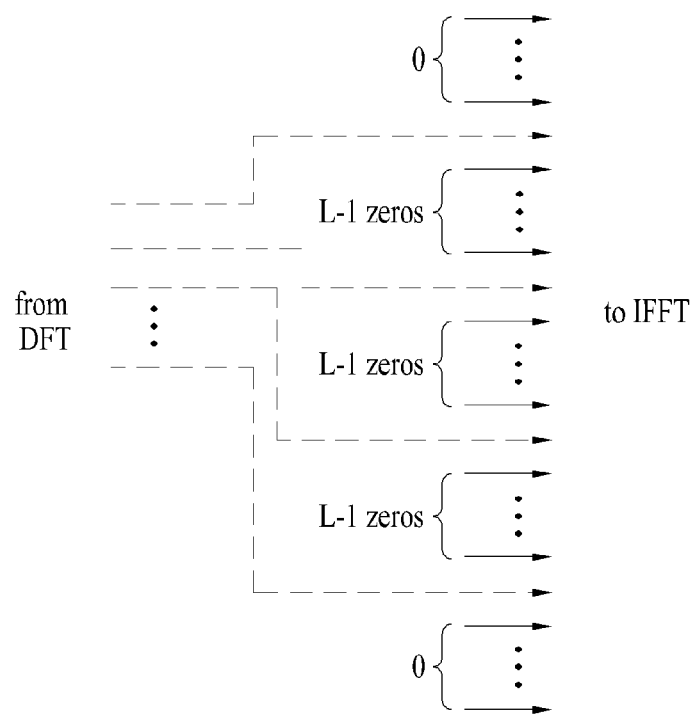
(b)

PUCCH format 1a and 1b structure (normal CP case)

PUCCH format 1a and 1b structure (extended CP case)

PUCCH format 2, 2a and 2b structure (normal CP case)

PUCCH format 2, 2a and 2b structure (extended CP case)

FIG. 19

Resource allocation: 18 ACK/NACK channels with normal CP $\Delta_{shift}^{PUCCH} = 2$

| Cell specific cyclic shift offset | | RS orthogonal cover | | | ACK/NACK orthogonal cover | | |
|---|---|---|---|---|---|---|---|
| $\delta_{offset}^{PUCCH} = 1$ | $\delta_{offset}^{PUCCH} = 0$ | $\bar{n}_{OC} = 0$ | $\bar{n}_{OC} = 1$ | $\bar{n}_{OC} = 2$ | $n_{OC} = 0$ | $n_{OC} = 1$ | $n_{OC} = 2$ |
| $n_{CS} = 1$ | $n_{CS} = 0$ | n' = 0 | | 12 | n' = 0 | | 12 |
| 2 | 1 | | 6 | | | 6 | |
| 3 | 2 | 1 | | 13 | 1 | | 13 |
| 4 | 3 | | 7 | | | 7 | |
| 5 | 4 | 2 | | 14 | 2 | | 14 |
| 6 | 5 | | 8 | | | 8 | |
| 7 | 6 | 3 | | 15 | 3 | | 15 |
| 8 | 7 | | 9 | | | 9 | |
| 9 | 8 | 4 | | 16 | 4 | | 16 |
| 10 | 9 | | 10 | | | 10 | |
| 11 | 10 | 5 | | 17 | 5 | | 17 |
| 0 | 11 | | 11 | | | 11 | |

$\Delta_{shift}^{PUCCH} \in \{1,2,3\}$ for normal cyclic prefix
$\{1,2,3\}$ for extended cyclic prefix $\delta_{offset}^{PUCCH} \in \{0,1,...,\Delta_{shift}^{PUCCH} - 1\}$ Cell specific cyclic shift offset $n_{OC}$ Orthogonal sequence index for ACK/NACK
$\bar{n}_{OC}$ Orthogonal sequence index for RS
$n_{CS}$ Cyclic shift value of a CAZAC sequence
n' ACK/NACK resource index used for the channelization in a RB

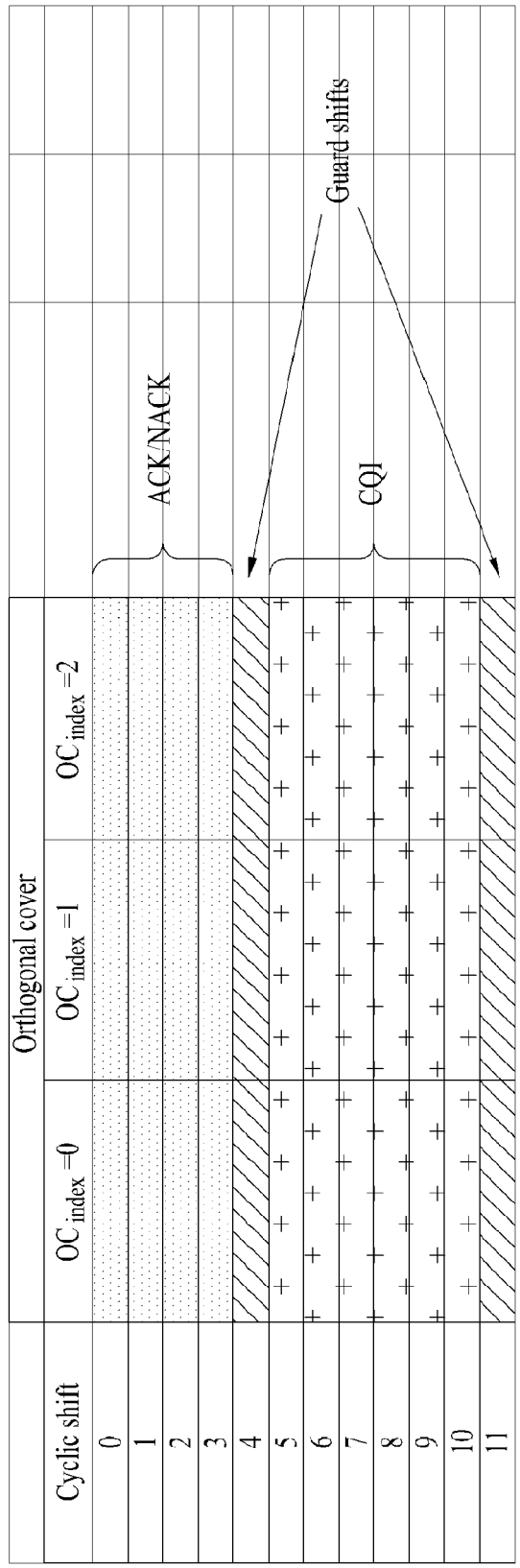

METHOD AND DEVICE FOR TRANSMITTING CONTROL INFORMATION IN A WIRELESS COMMUNICATION SYSTEM

This application is the National Phase of PCT/KR2011/008241 filed on Nov. 1, 2011, which claims priority under 35 U.S.C. 119(e) to US Provisional Application Nos. 61/409,897 filed on Nov. 3, 2010 and 61/410,925 filed Nov. 7, 2010, all of which are hereby expressly incorporated by reference into the present application.

TECHNICAL FIELD

The present invention relates to a wireless communication system, and more particularly, to a method and apparatus for transmitting control information. The wireless communication system may support Carrier Aggregation (CA).

BACKGROUND ART

Wireless communication systems have been widely deployed to provide various types of communication services such as voice or data services. Generally, a wireless communication system is a multiple access system capable of supporting communication with multiple users by sharing available system resources (bandwidth, transmit power, etc.). Multiple access systems include, for example, a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DETAILED DESCRIPTION OF THE INVENTION

Technical Problems

It is an object of the present invention to provide a method and apparatus for efficiently transmitting control information in a wireless communication system. It is another object of the present invention to provide a channel format and a signal processing method and apparatus, for efficiently transmitting control information. It is a further object of the present invention to provide a method and apparatus for efficiently allocating resources for transmission of control information.

It will be appreciated by persons skilled in the art that that the technical objects that can be achieved through the present invention are not limited to what has been particularly described hereinabove and other technical objects of the present invention will be more clearly understood from the following detailed description.

Technical Solutions

The object of the present invention can be achieved by providing a method of transmitting control information including positive/negative acknowledgements (ACK/NACKs) and a scheduling request (SR) by a user equipment (UE) in a wireless communication system. The method includes receiving a plurality of Physical Downlink Shared Channels (PDSCHs), and transmitting a plurality of ACK/NACKs and an SR corresponding to the plurality of PDSCHs using Physical Uplink Control Channel (PUCCH) Format 3. The plurality of ACK/NACKs are divided into first and second segments. The SR is added to an end of the second segment and jointly encoded with plural ACK/NACKs of the second segment to which the SR is added.

In another aspect of the present invention, provided herein is an apparatus for transmitting control information including a plurality of ACK/NACKs and an SR in a wireless communication system. The apparatus includes a Radio Frequency (RF) unit, and a processor for controlling the RF unit to receive a plurality of PDSCHs and to transmit a plurality of ACK/NACKs and an SR corresponding to the plurality of PDSCHs using PUCCH Format 3. The plurality of ACK/NACKs are divided into first and second segments, and the SR is added to an end of the second segment and jointly encoded with plural ACK/NACKs of the second segment to which the SR is added.

The number of ACK/NACKs corresponding to a rounded-up value of N/2 may be divided into the first segment, and the number of ACK/NACKs, obtained by excluding the number of ACK/NACKs divided into the first segment from N, may be divided into the second segment, when the number of the plurality of ACK/NACKs is N.

The SR may be added to the second segment.

Repetition coding may be performed on the SR to generate 2×m (m is an arbitrary integer) SRs, and the generated SRs may be equally divided into and added to the first and second segments.

The SR may be added to the end of the second segment when N is an odd number, and repetition coding may be performed on the SR to generate 2×m (m is an arbitrary integer) SRs and the generated SRs are equally divided into and added to the first and second segments when N is an even number.

The number of the plural ACK/NACK may exceed 11.

The encoding may correspond to dual Reed-Muller (RM) coding.

Advantageous Effects

According to the present invention, control information can be efficiently transmitted in a wireless communication system. Further, a channel format and a signal processing method for efficiently transmitting resources can be provided. Moreover, resources for transmission of control information can be efficiently allocated.

It will be appreciated by persons skilled in the art that that the effects that can be achieved through the present invention are not limited to what has been particularly described hereinabove and other advantages of the present invention will be more clearly understood from the following detailed description.

The accompanying drawings, which are included as a part of the detailed description to provide a further understanding of the invention, provide embodiments of the invention and together with the description serve to explain the principle of the invention. In the drawings, FIG. 1 illustrates physical channels used in a 3GPP LTE system which is an exemplary wireless communication system and a general signal transmission method using the physical channels;

FIG. 6 illustrates signal mapping schemes in the frequency domain while satisfying a single carrier property;

Figure 15:
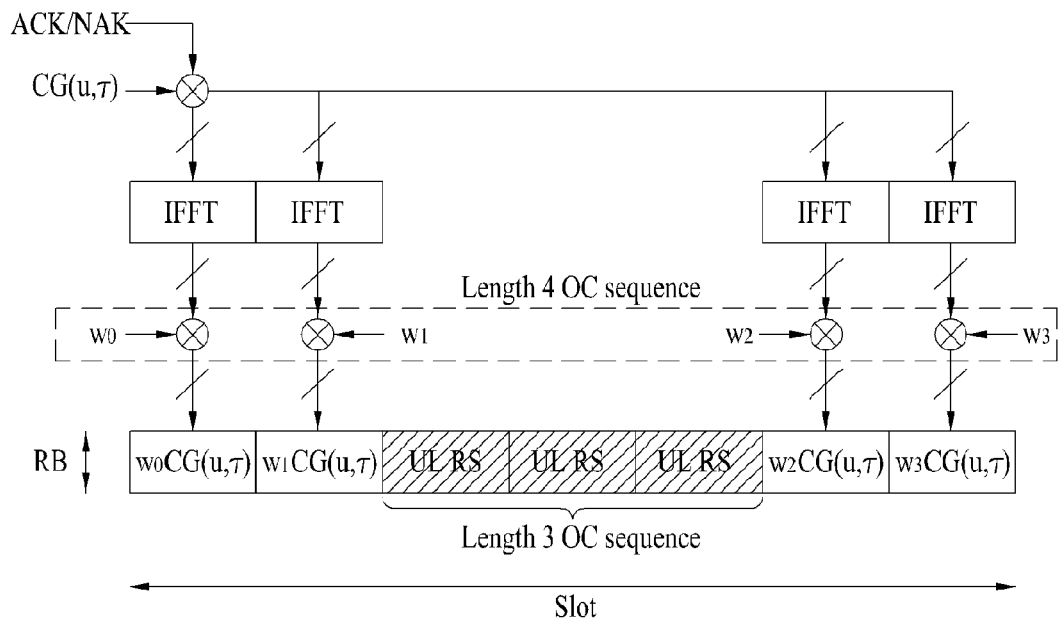
Figure 16:
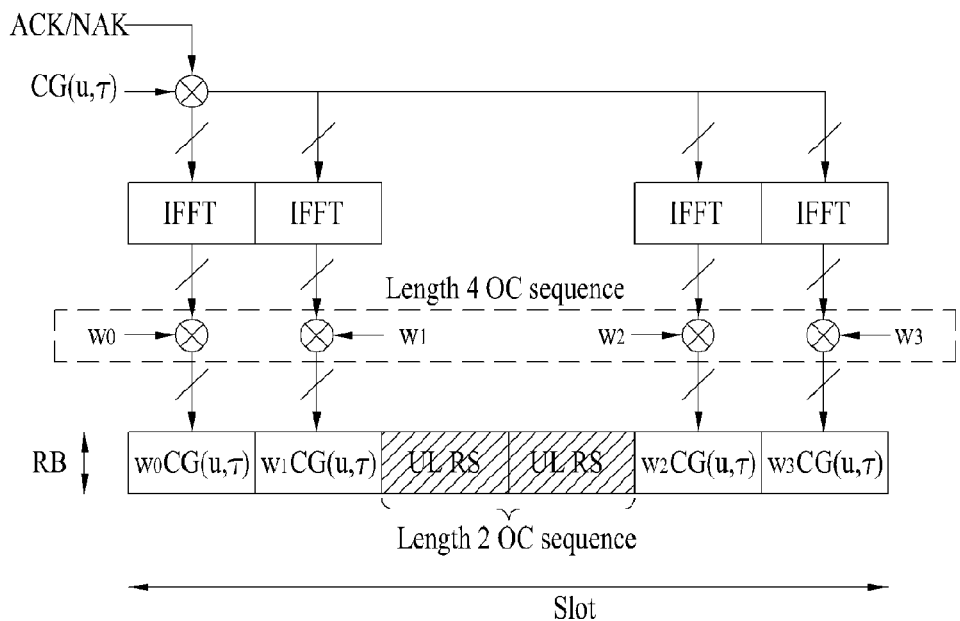
Figure 17:
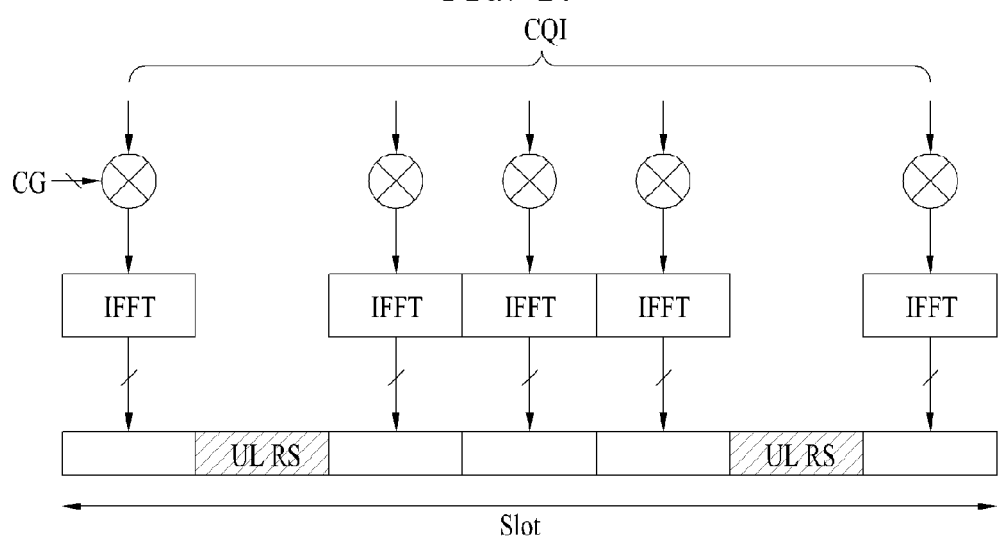
Figure 18:
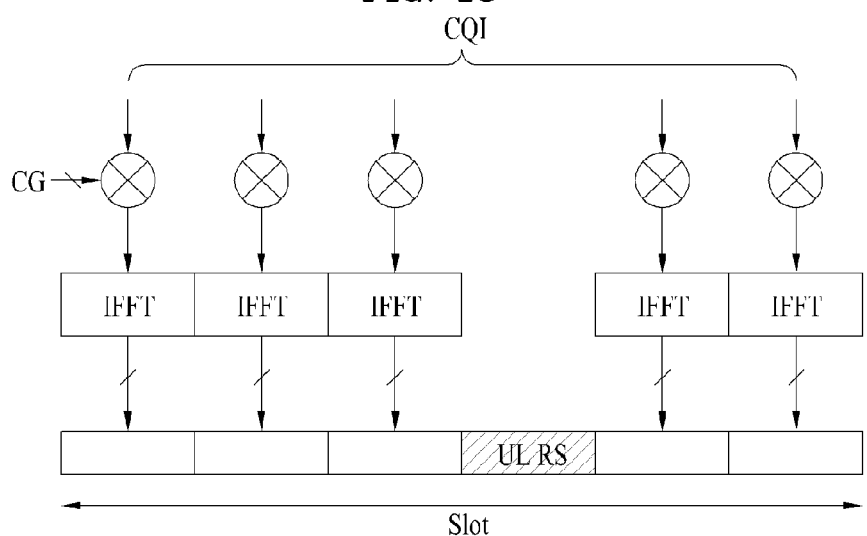
Figure 21:
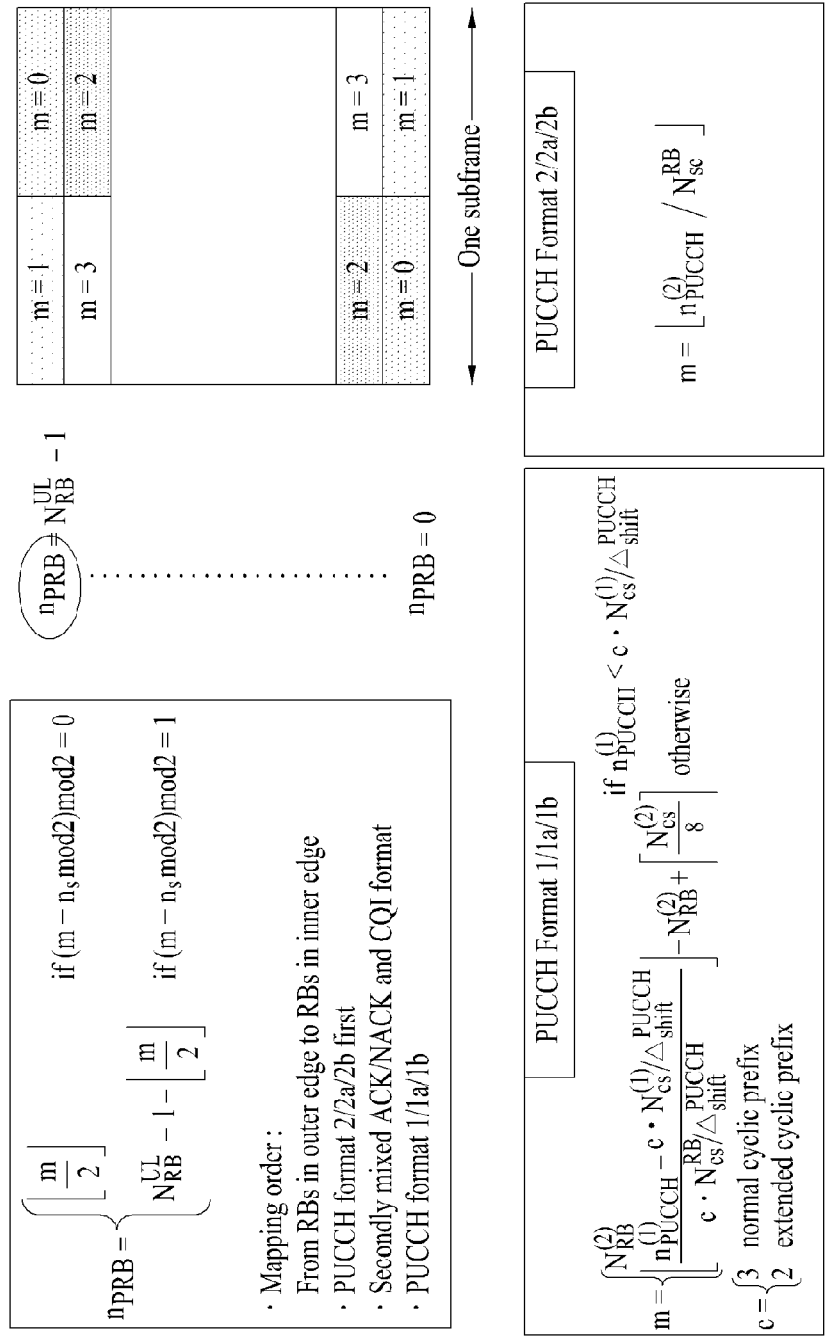
Figure 22:
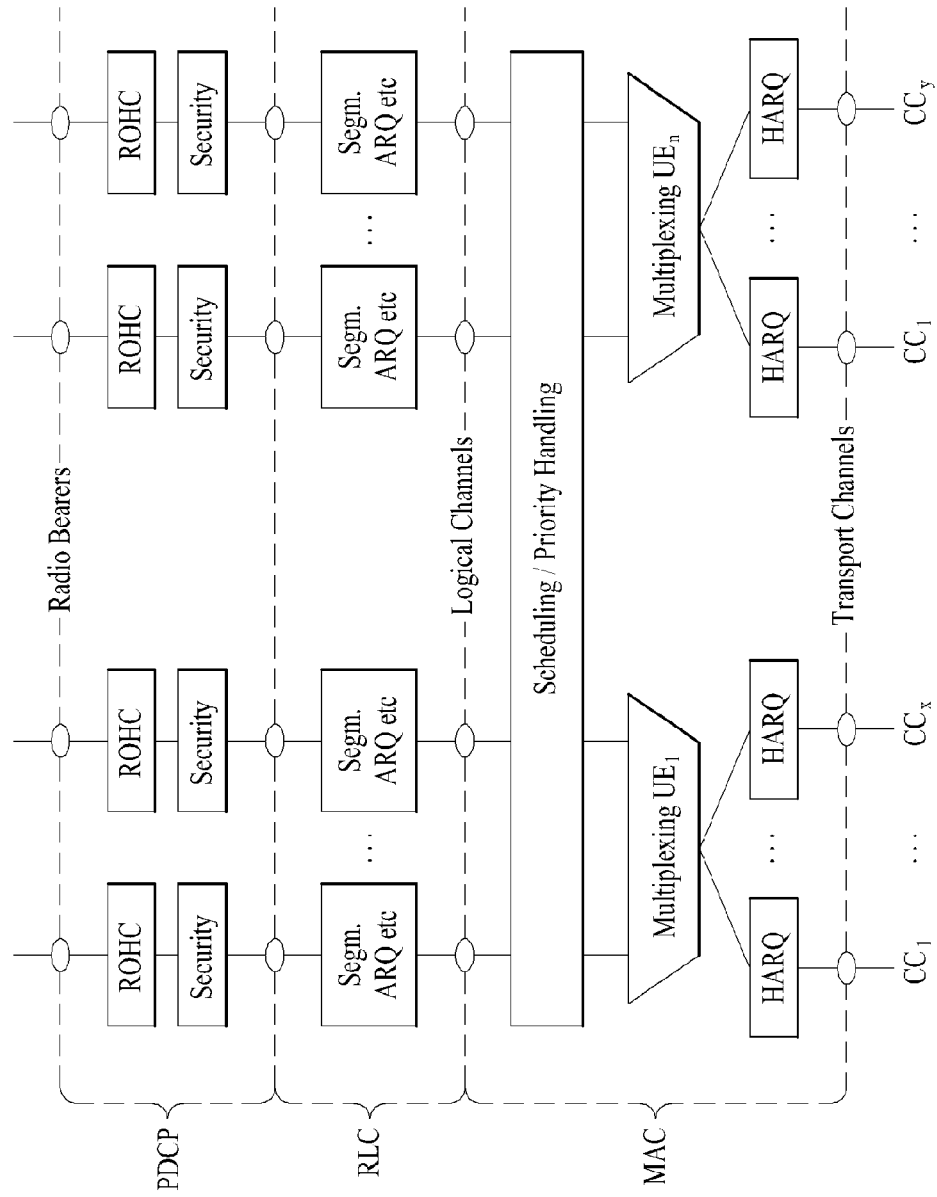
Figure 23:
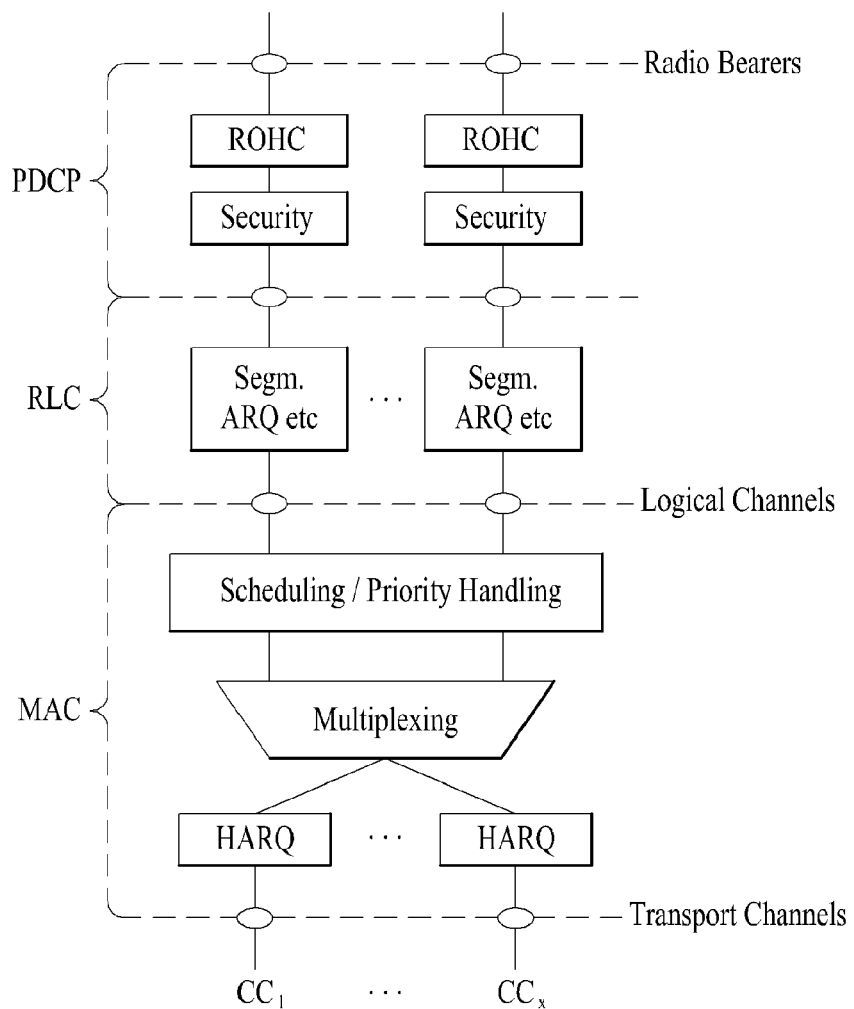
Figure 24:
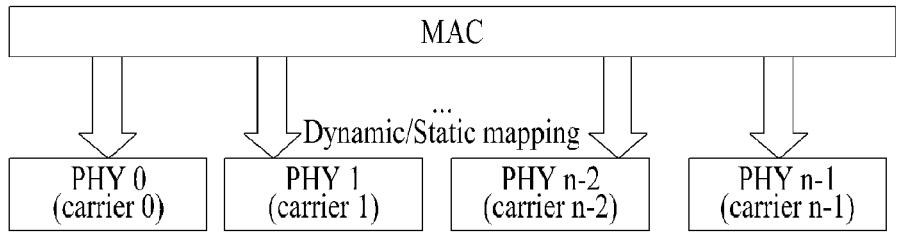
Figure 25:
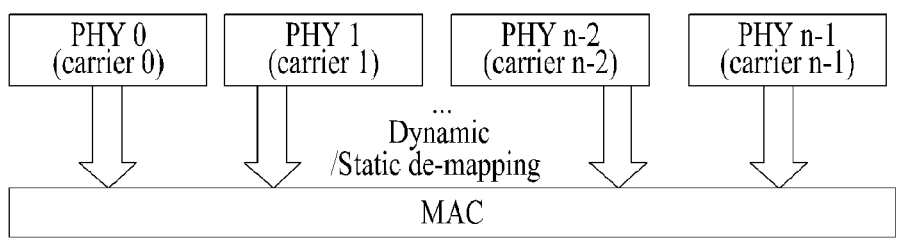
Figure 26:
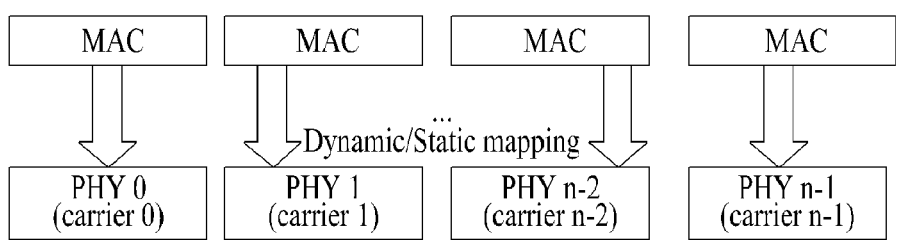
Figure 27:
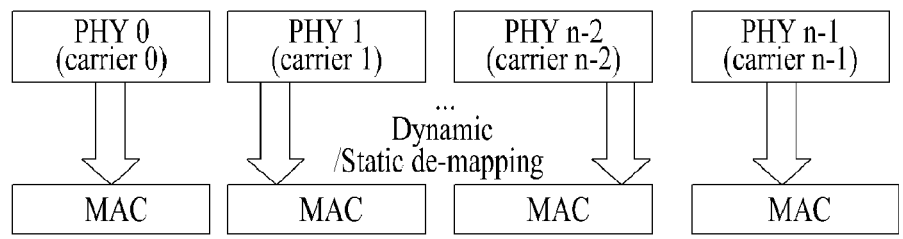
Figure 28:
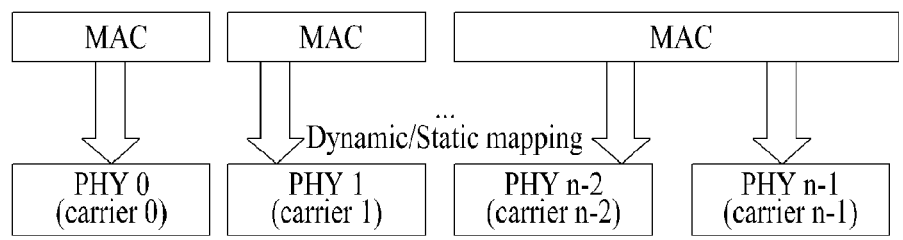
Figure 29:
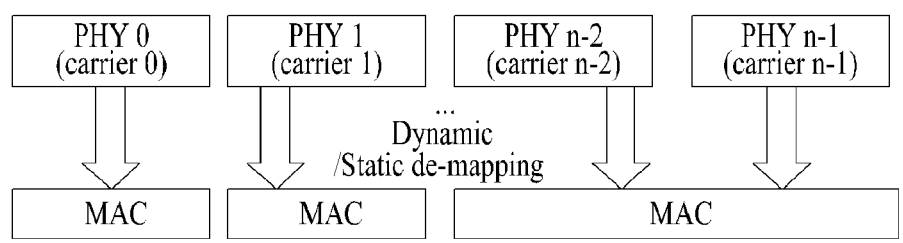
Figure 30:
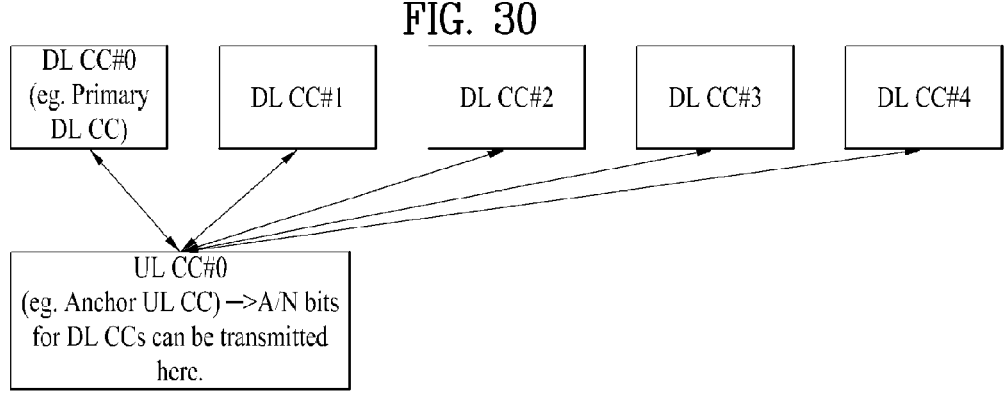
Figure 37:
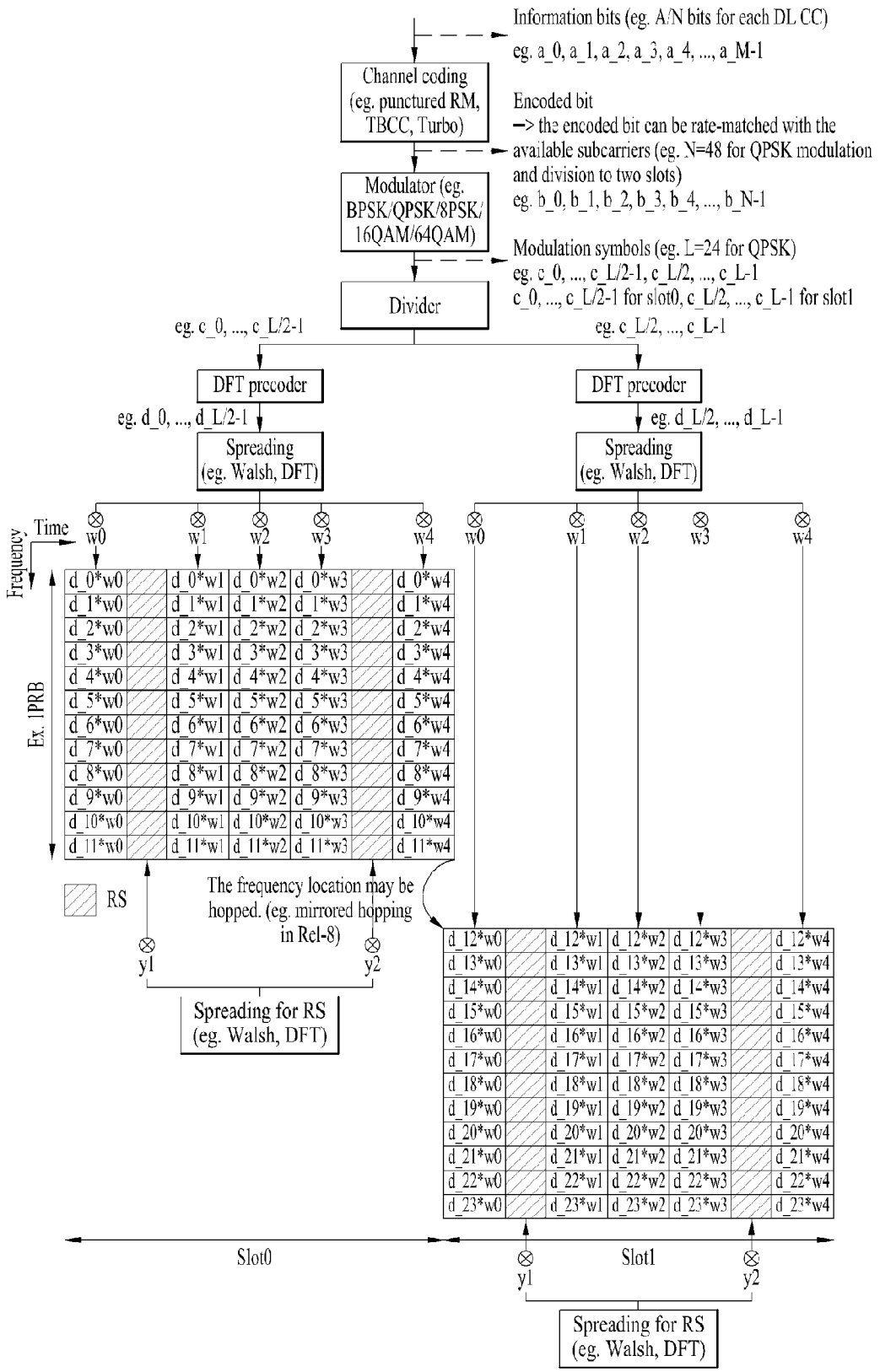
Figure 38:
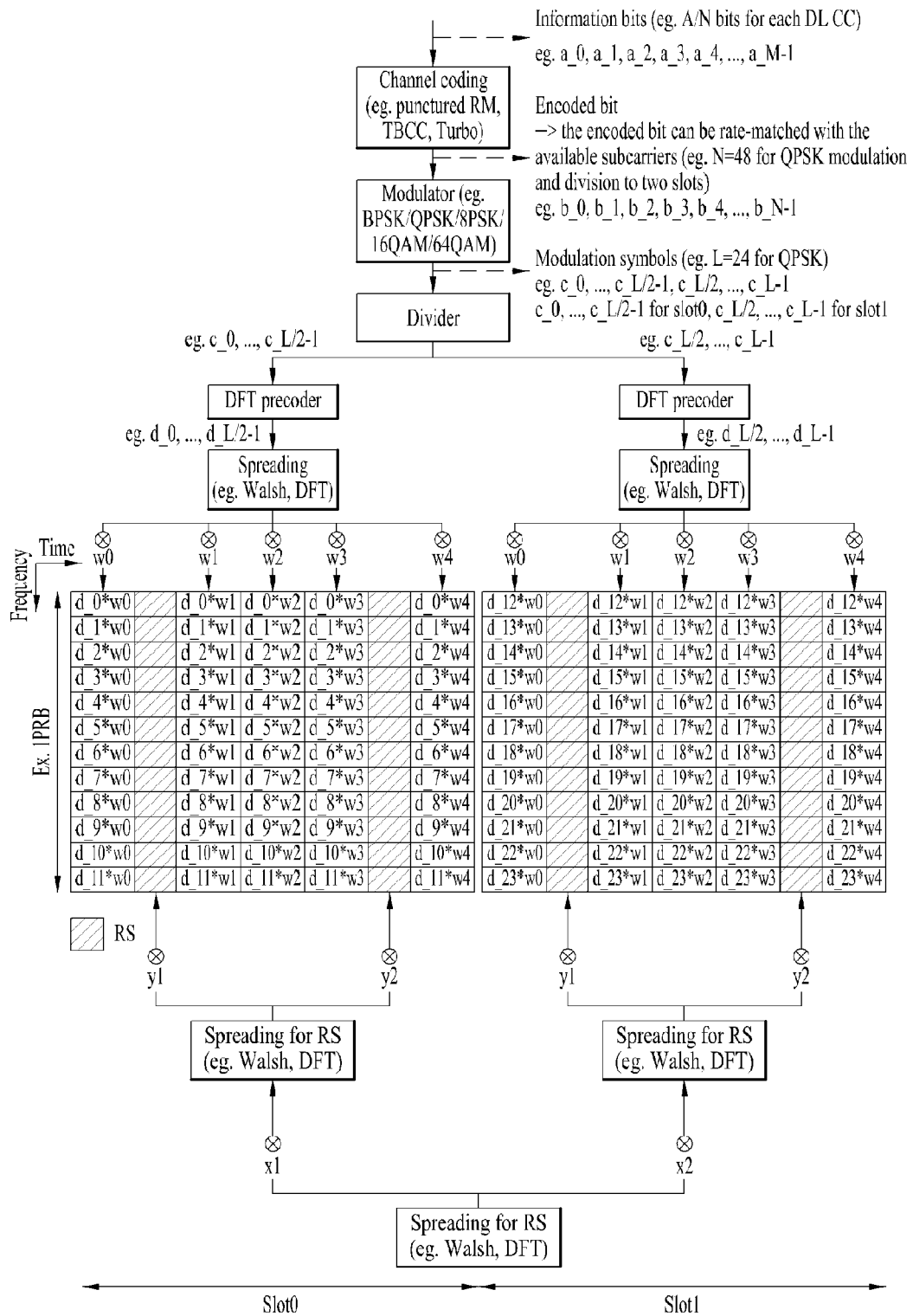
Figure 39:
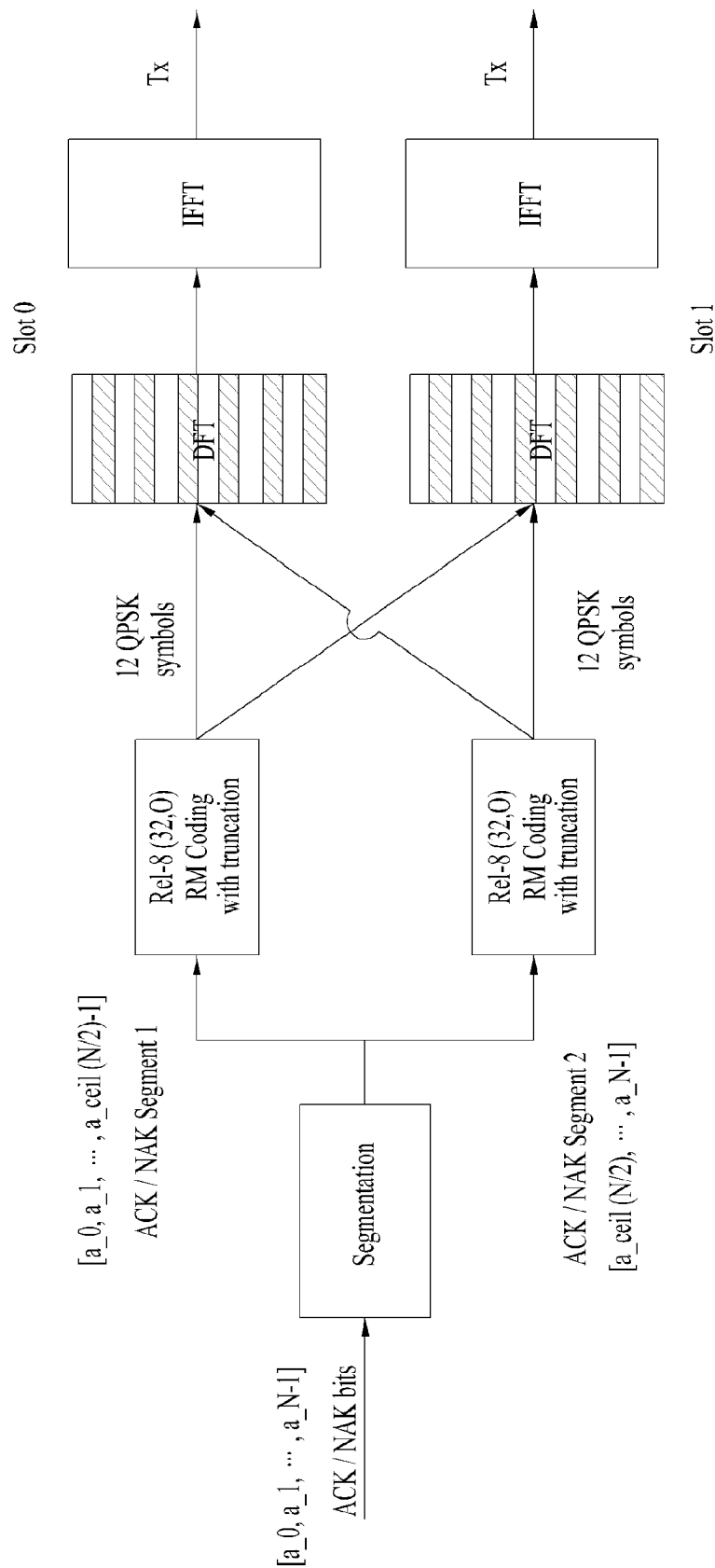
Figure 40:
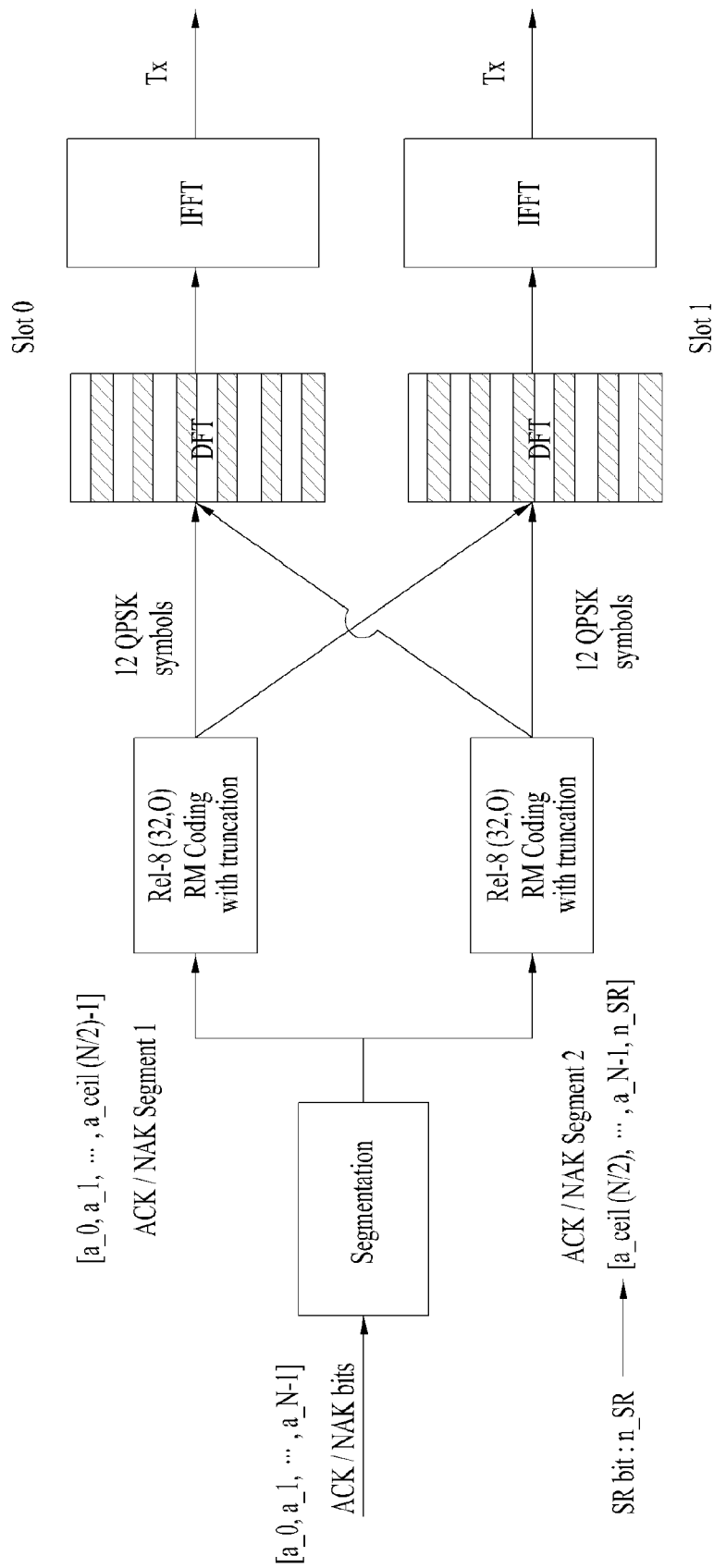
Figure 41:
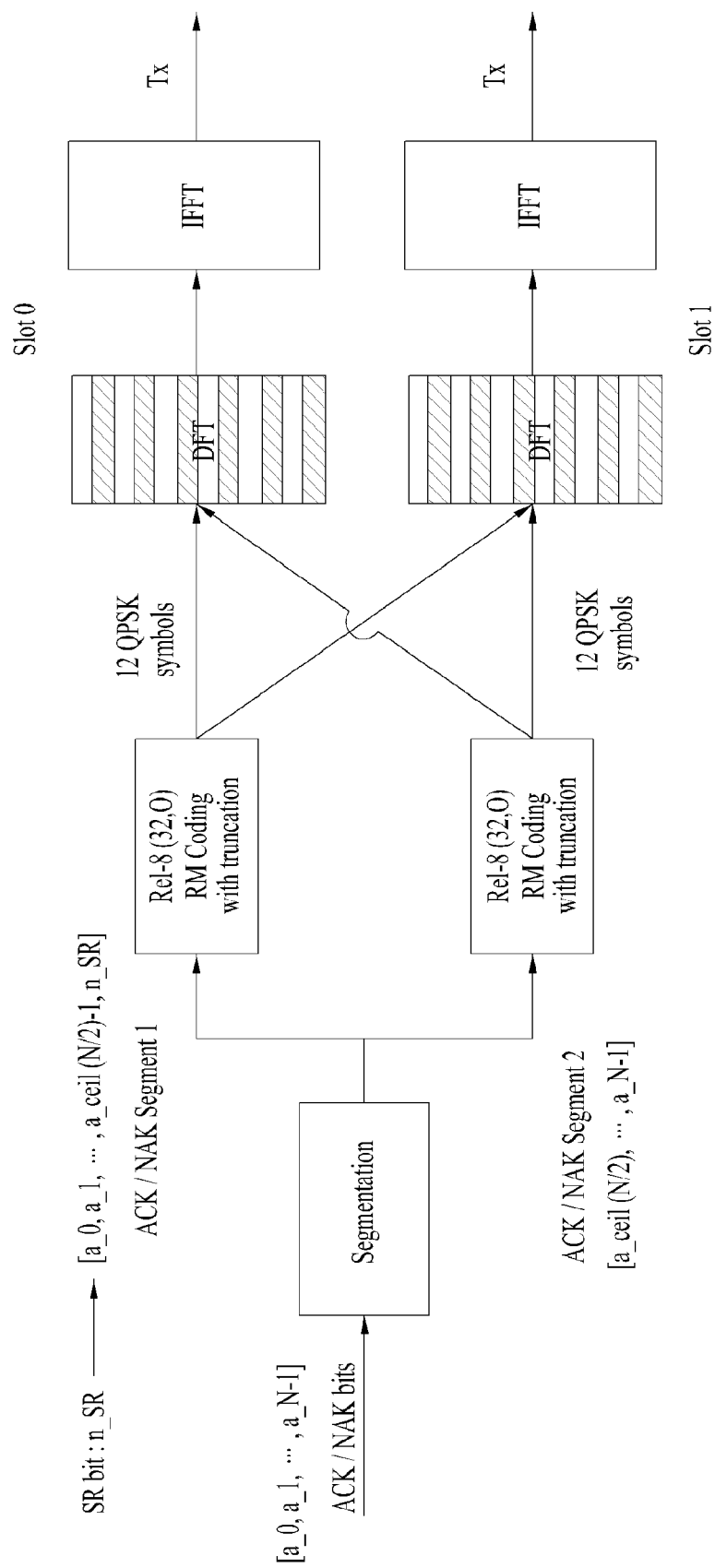
Figure 42:
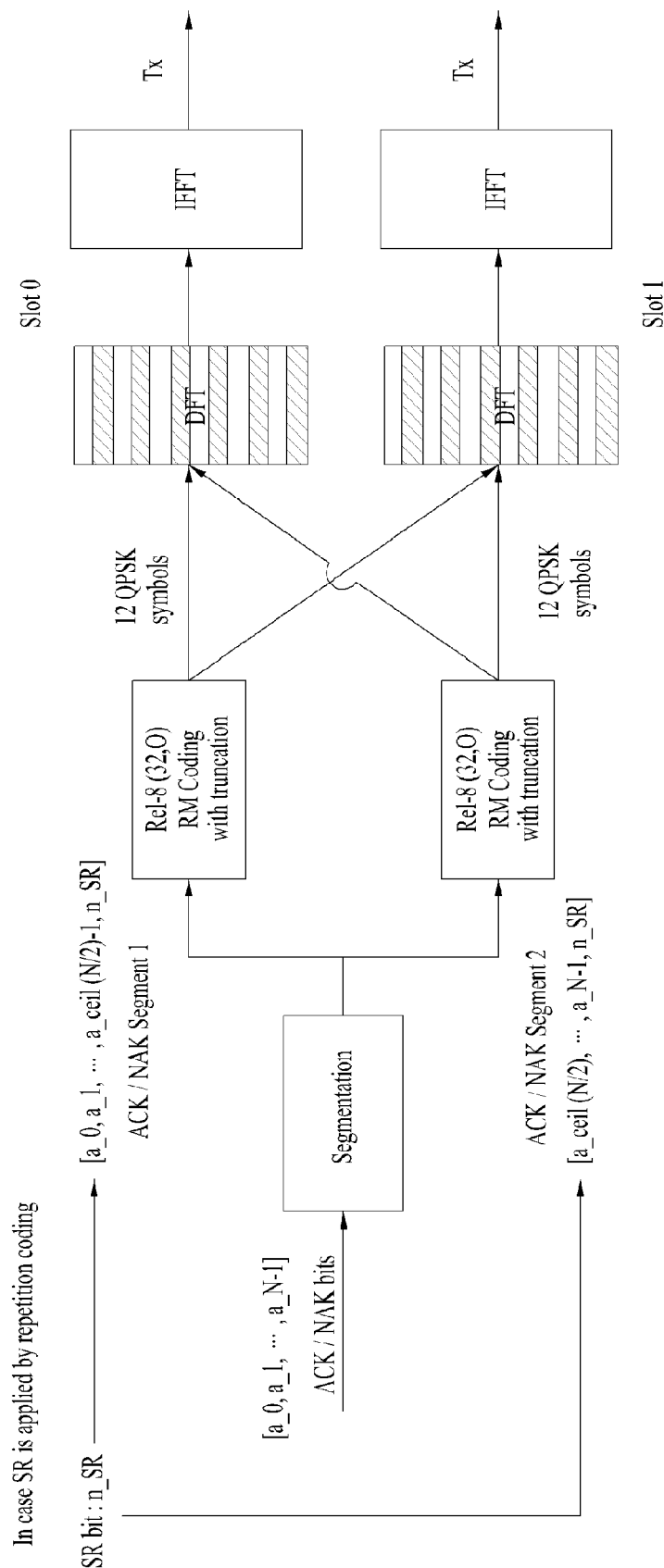
Figure 43:
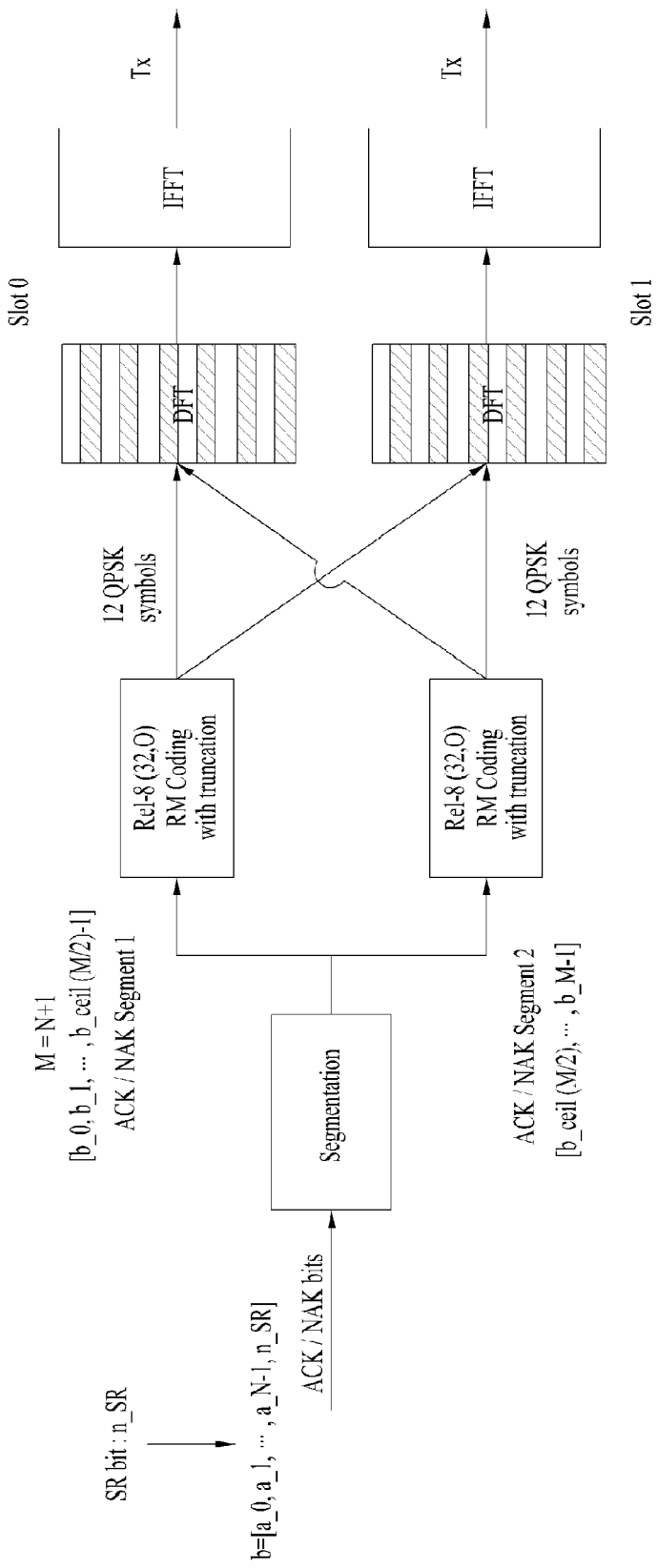
Figure 44:
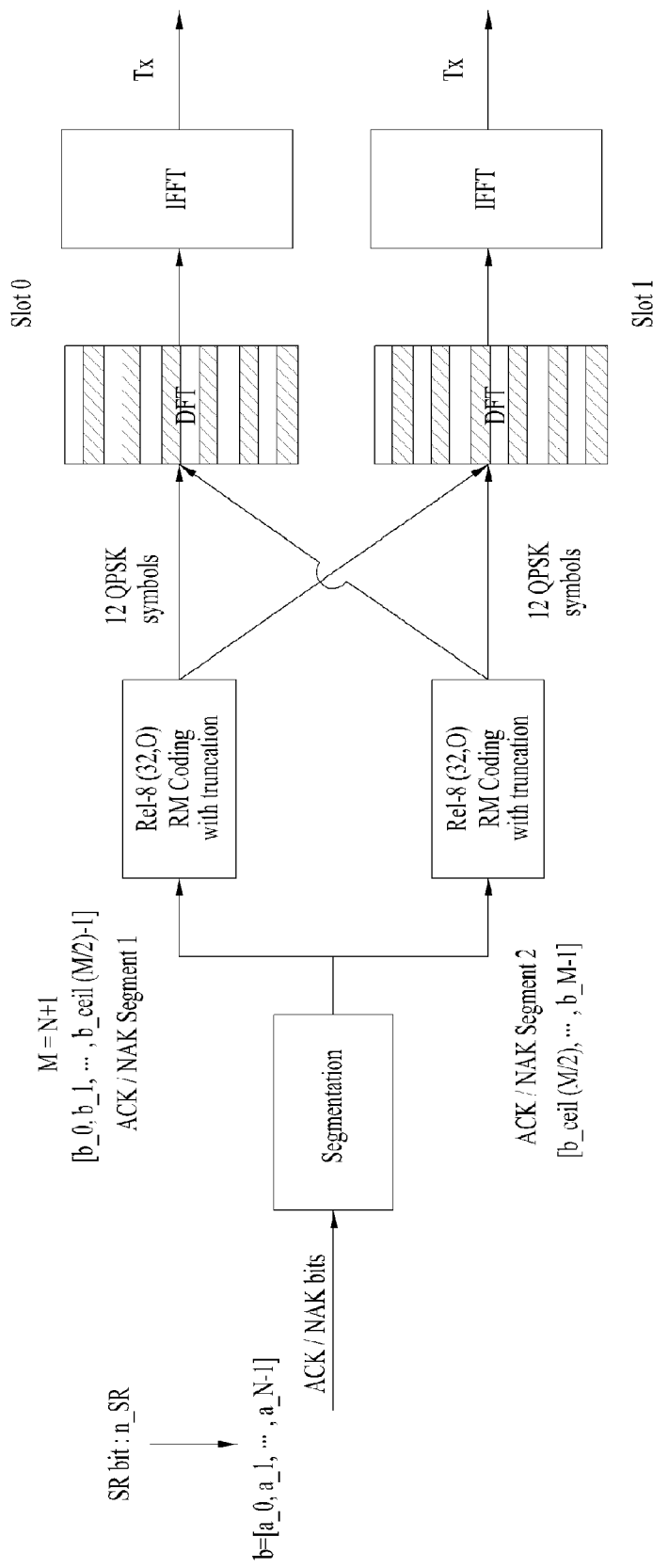
Figure 45:
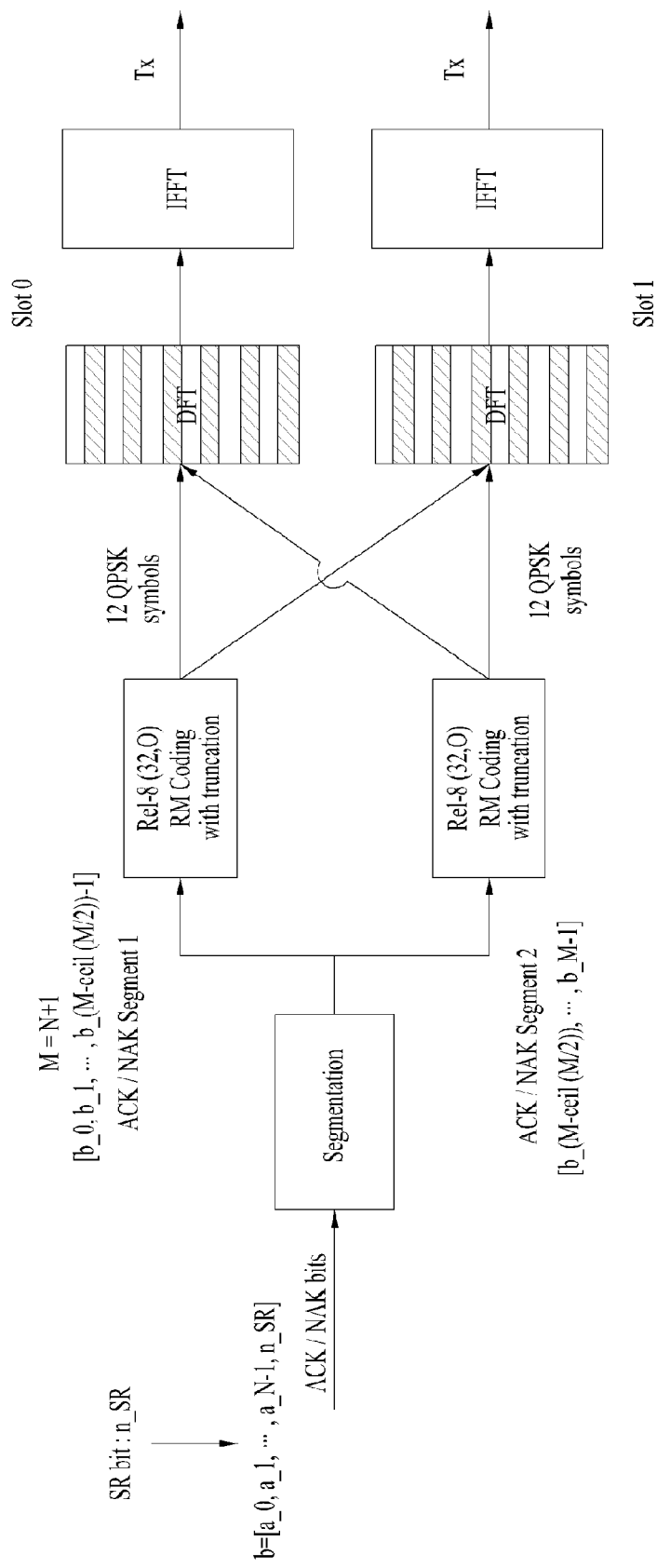
Figure 46:
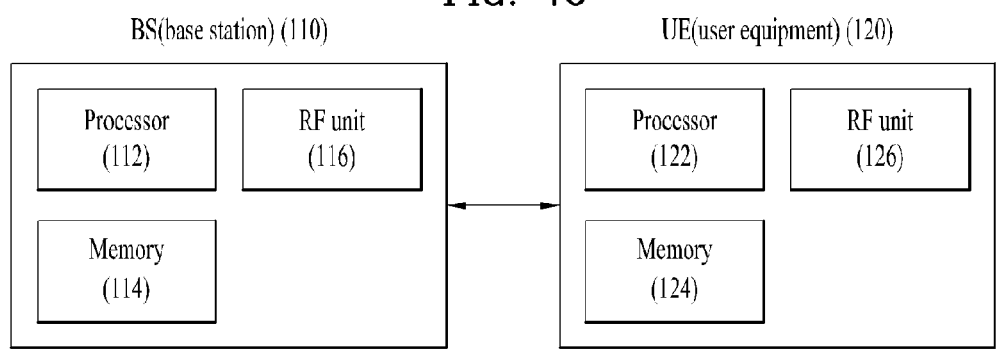

FIGS. 15 and 16 illustrate slot level structures of PUCCH formats 1a and 1b;

FIGS. 17 and 18 illustrate slot level structures of PUCCH formats 2/2a/2b;

FIG. 19 illustrates ACK/NACK channelization for PUCCH Formats 1a and 1b;

FIG. 20 illustrates channelization for a hybrid structure of PUCCH Format 1/1a/1b and PUCCH Format 2/2a/2b in the same PRB;

FIG. 21 illustrates PRB allocation for PUCCH transmission;

FIG. 22 illustrates a concept of downlink component carrier in a BS;

FIG. 23 illustrates a concept of uplink component carrier management in a UE;

FIG. 24 illustrates a concept of multi-carrier management of one MAC in a BS;

FIG. 25 illustrates multi-carrier management of one MAC in a UE;

FIG. 26 illustrates a concept of multi-carrier management of a plurality of MACs in a BS;

FIG. 27 illustrates a concept of multi-carrier management of a plurality of MACs in a UE;

FIG. 28 illustrates another concept of multi-carrier management of a plurality of MACs in a BS;

FIG. 29 illustrates another concept of multi-carrier management of a plurality of MACs in a UE;

FIG. 30 illustrates asymmetric carrier aggregation in which a plurality of downlink component carriers is linked with one uplink carrier component;

FIGS. 31 to 36 illustrate PUCCH Format 3 structures and signal processing operations;

FIGS. 37 and 38 illustrate PUCCH Format 3 structures in which RS multiplexing capacity is increased and signal processing operations;

FIG. 39 is a block diagram for explaining Dual RM coding to which the present invention is applied;

FIG. 40 illustrates a joint encoding method according to a first embodiment of the present invention;

FIG. 41 illustrates a joint encoding method according to a second embodiment of the present invention;

FIG. 42 illustrates a joint encoding method according to a third embodiment of the present invention;

FIG. 43 illustrates a joint encoding method according to a fourth embodiment of the present invention;

FIGS. 44 and 45 illustrate a joint encoding method according to a sixth embodiment of the present invention; and FIG. 46 illustrates a BS and a UE that are applicable to the present invention.

BEST MODE FOR CARRYING OUT THE INVENTION

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

Techniques, devices, and systems described herein may be used in various wireless multiple access systems. The wireless access system includes, for example, Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), and Multi-Carrier Frequency Division Multiple Access (MC-FDMA) systems. CDMA may be implemented as a radio technology such as Universal Terrestrial Radio Access (UTRA) or CDMA2000. TDMA may be implemented as a radio technology such as Global System for Mobile communication (GSM), General Packet Radio Service (GPRS), and Enhanced Data Rates for GSM Evolution (EDGE). OFDMA may be implemented as a radio technology such as Institute of Electrical and Electronics Engineers (IEEE) 802.11 (Wi-Fi), IEEE 802.16 (WiMAX), IEEE 802.20, and Evolved-UTRA (E-UTRA). UTRAN is a part of Universal Mobile Telecommunication System (UMTS) and 3rd Generation Partnership Project (3GPP) Long Term Evolution (LTE) is a part of Evolved UMTS (E-UMTS) using E-UTRAN. 3GPP LTE employs OFDMA on downlink and SC-FDMA on uplink. LTE-A is an evolved version of 3GPP LTE. For convenience of description, it is assumed that the present invention is applied to 3GPP LTE/LTE-A. However, the technical features of the present invention are not limited thereto.

In a wireless communication system, a User Equipment (UE) receives information through downlink from a Base Station (BS) and transmits information through uplink to the BS. Information transmitted and received by the BS and UE includes data and various control information and there are various physical channels according to type/usage of information transmitted and received by the BS and UE.

Figure 1:
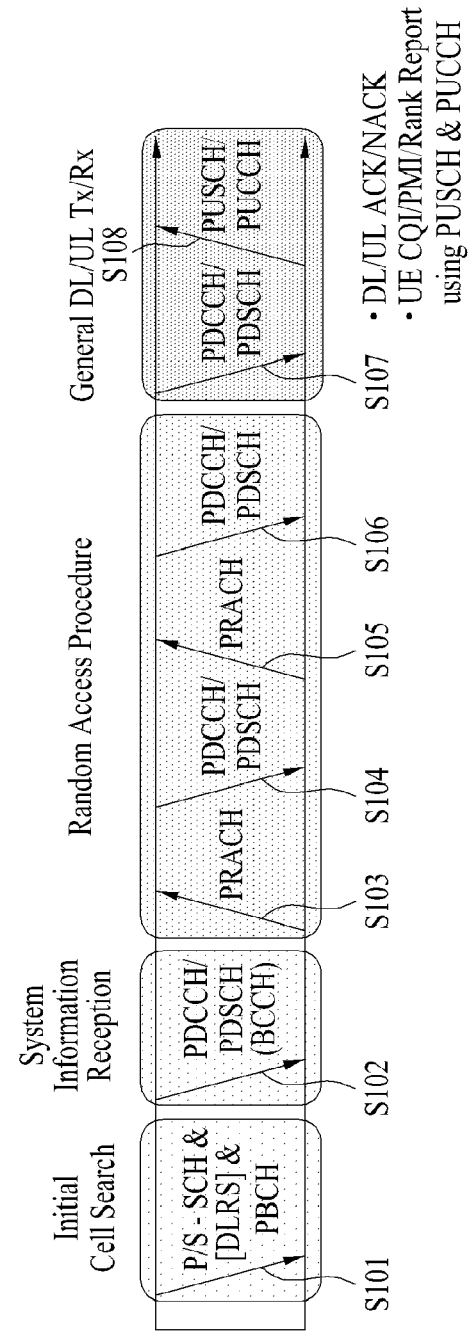

FIG. 1 illustrates physical channels used in a $3^{rd}$ Generation Partnership Project (3GPP) Long Term Evolution (LTE) system and a general signal transmission method using the physical channels.

Referring to FIG. 1, upon power-on or when a UE initially enters a cell, the UE performs an initial cell search involving synchronization of its timing to a BS in step S101. For the initial cell search, the UE may be synchronized to the BS and acquire information such as a cell Identifier (ID) by receiving a Primary Synchronization CHannel (P-SCH) and a Secondary Synchronization CHannel (S-SCH). Then the UE may receive broadcast information from the cell on a Physical Broadcast CHannel (PBCH). In the mean time, the UE may determine a downlink channel status by receiving a DownLink Reference Signal (DL RS) during the initial cell search.

After the initial cell search, the UE may acquire more specific system information by receiving a Physical Downlink Control CHannel (PDCCH) and receiving a Physical Downlink Shared CHannel (PDSCH) based on information of the PDCCH in step S102.

Next, in order to complete access to the BS, the UE may perform a random access procedure as indicated in steps S103 to S106. To this end, the UE may transmit a preamble through a Physical Random Access CHannel (PRACH) (S103) and receive a response message to the preamble through the PDCCH and the PDSCH corresponding to the PDCCH (S104). If the random access procedure is contention-based, the UE may additionally perform a contention resolution procedure such as transmission of the PDSCH (S104) and reception of the PDCCH and the PDSCH corresponding to the PDCCH (S106).

The UE which has performed the above procedures may then receive a PDCCH/PDSCH (S107) and transmit a Physical Uplink Shared CHannel (PUSCH)/Physical Uplink Control CHannel (PUCCH) (S108), as a general uplink/downlink (UL/DL) signal transmission procedure. Control information that the UE transmits to the BS is collectively referred to as Uplink Control Information (UCI). UCI includes a Hybrid Automatic Repeat and request (HARQ) Acknowledgement/Negative Acknowledgement (ACK/NACK) signal, a Scheduling Request (SR), a Channel Quality Indicator (CQI), a Precoding Matrix Index (PMI), a Rank Indicator (RI), and the like. In this specification, HARQ ACK/NACK is simply referred to as HARQ-ACK or ACK/NACK (A/N). HARQ-ACK includes at least one of positive ACK (simply, ACK), negative ACK (NACK), DTX, and NACK/DTX. While UCI is generally transmitted through the PUCCH, UCI may be transmitted through the PUSCH in the case where control information and traffic data should be simultaneously transmitted. In addition, UCI may be aperiodically transmitted through the PUSCH at the request/command of a network.

Figure 2:
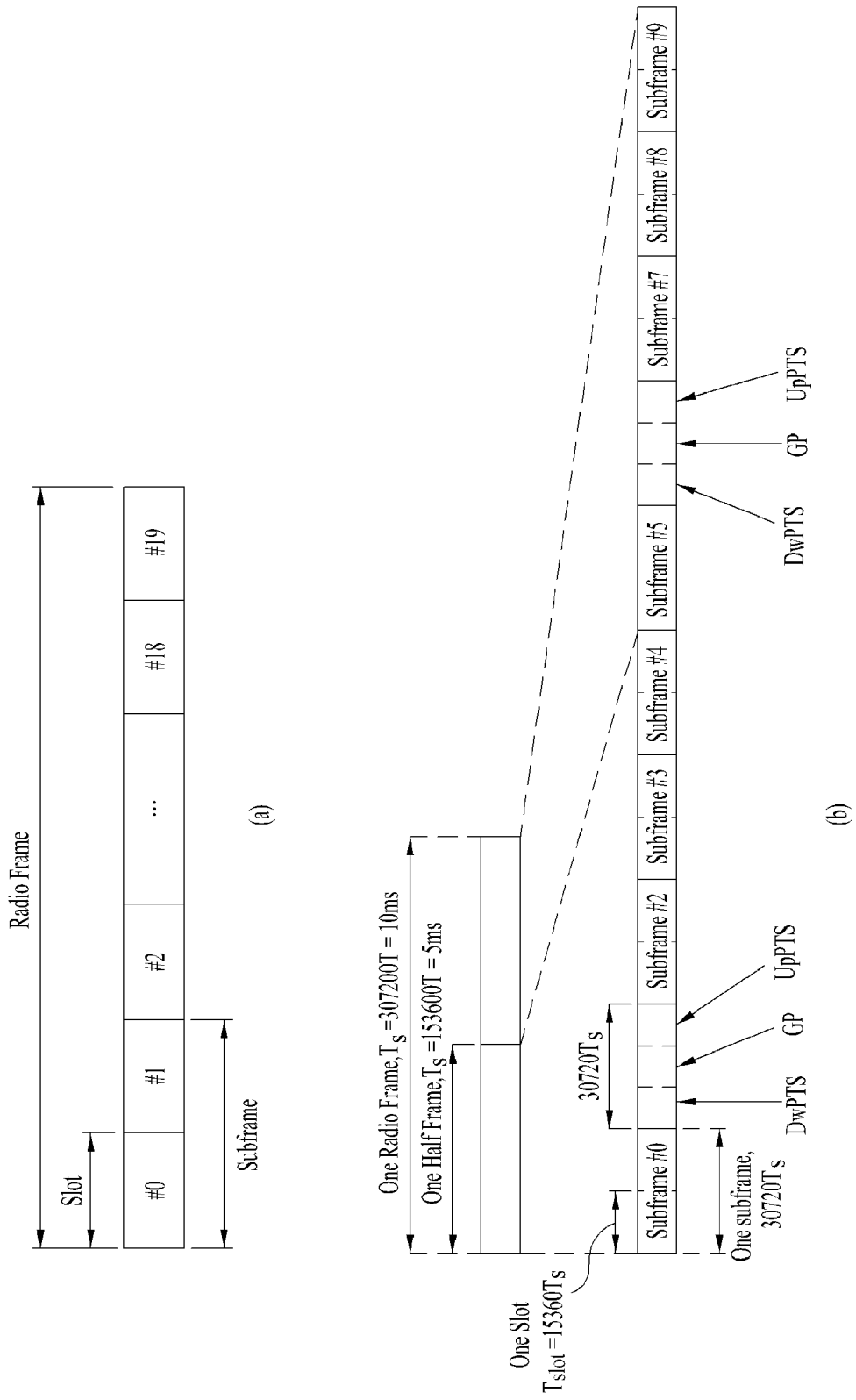
FIG. 2 illustrates radio frame structures.

FIG. 2 illustrates exemplary radio frame structures used in a wireless communication system. In a cellular OFDM radio packet communication system, uplink/downlink data packet transmission is performed in subframe units. One subframe is defined as a predetermined time interval including a plurality of OFDM symbols. The 3GPP LTE standard supports a type 1 radio frame structure applicable to Frequency Division Duplex (FDD) and a type 2 radio frame structure applicable to Time Division Duplex (TDD).

FIG. 2(a) illustrates the structure of the type 1 radio frame. A downlink radio frame includes 10 subframes, and one subframe includes two slots in the time domain. A time required to transmit one subframe is defined as a Transmission Time Interval (TTI). For example, one subframe may have a length of 1 ms and one slot may have a length of 0.5 ms. One slot includes a plurality of OFDM symbols in the time domain and includes a plurality of Resource Blocks (RBs) in the frequency domain. Since a 3GPP LTE system adopts OFDMA in downlink, an OFDM symbol indicates one symbol interval. The OFDM symbol may be referred to as an SC-FDMA symbol or a symbol interval. An RB as a resource allocation unit includes a plurality of contiguous subcarriers in a slot.

The number of OFDM symbols included in one slot may be changed according to the configuration of a Cyclic Prefix (CP). The CP includes an extended CP and a normal CP. For example, if the OFDM symbols are configured by the normal CP, the number of OFDM symbols included in one slot may be seven. If the OFDM symbols are configured by the extended CP, since the length of one OFDM symbol is increased, the number of OFDM symbols included in one slot is less than that of the case of the normal CP. In case of the extended CP, for example, the number of OFDM symbols included in one slot may be six. If a channel state is unstable, for example, if a UE moves at a high speed, the extended CP may be used in order to further reduce inter-symbol interference.

In case of using the normal CP, since one slot includes 7 OFDM symbols, one subframe includes 14 OFDM symbols. At this time, a maximum of the first three OFDM symbols of each subframe may be allocated to a PDCCH and the remaining OFDM symbols may be allocated to a PDSCH.

FIG. 2(b) illustrates the structure of the type 2 radio frame. The type 2 radio frame includes two half frames, each of which includes five subframes, a Downlink Pilot Time Slot (DwPTS), a Guard Period (GP), and an Uplink Pilot Time Slot (UpPTS). One subframe includes two slots. DwPTS is used for initial cell search, synchronization, or channel estimation in a UE. UpPTS is used for channel estimation in a BS and uplink transmission synchronization of the UE. GP is located between uplink and downlink to remove interference generated in uplink due to multi-path delay of a downlink signal.

The structure of the radio frame is only exemplary. Accordingly, the number of subframes included in the radio frame, the number of slots included in the subframe, or the number of symbols included in the slot may be changed in various manners.

Figure 3:
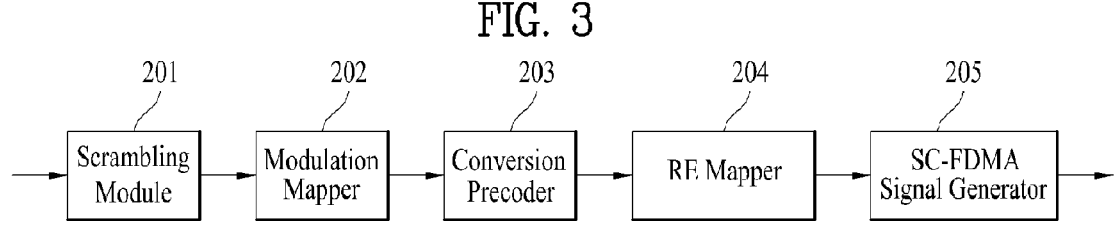
FIG. 3 illustrates an uplink signal processing operation.

FIG. 3 illustrates a signal processing operation for transmitting an uplink signal in a UE.

A scrambling module 201 may scramble a transmission signal using a scrambling signal in order to transmit an uplink signal. A modulation mapper 202 modulates the scrambled signal received from the scrambling module 201 to complex modulation symbols using Binary Phase Shift Keying (BPSK), Quadrature Phase Shift Keying (QPSK), or 16 Quadrature Amplitude Modulation (QAM)/64 QAM according to the type of the transmission signal or a channel state. A precoder 203 processes the complex modulation symbols received from the modulation mapper 202. An RE mapper 204 may map the complex modulation symbols received from the precoder 203 to time-frequency REs. After being processed in an SC-FDMA signal generator 205, the mapped signal may be transmitted to a BS through an antenna.

Figure 4:
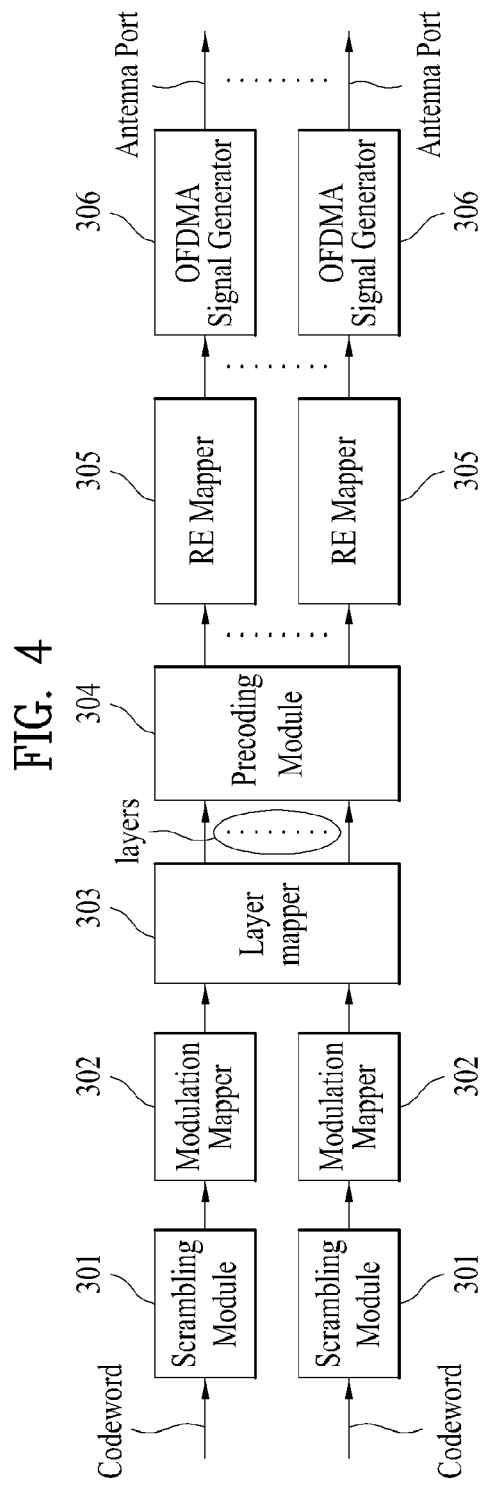
FIG. 4 illustrates a downlink signal processing operation.

FIG. 4 illustrates a signal processing operation for transmitting a downlink signal in a BS.

In an 3GPP LTE system, the BS may transmit one or more codewords on downlink. Scrambling modules 301 and modulation mappers 302 may process the codewords into complex symbols, as in FIG. 3. A layer mapper 303 maps the complex symbols to a plurality of layers. A precoding module 304 may multiply the layers by a precoding matrix and may allocate the multiplied signals to respective transmission antennas. RE mappers 305 map the antenna-specific signals processed by the precoding module 304 to time-frequency REs. After being processed in OFDMA signal generators 306, the mapped signals may be transmitted through the respective antennas.

In the wireless communication system, uplink signal transmission from a UE is more problematic than downlink signal transmission from a BS in Peak-to-Average Power Ratio (PAPR). Accordingly, SC-FDMA is adopted for uplink signal transmission, unlike OFDMA used for downlink signal transmission as described above with reference to FIGS. 3 and 4.

Figure 5:
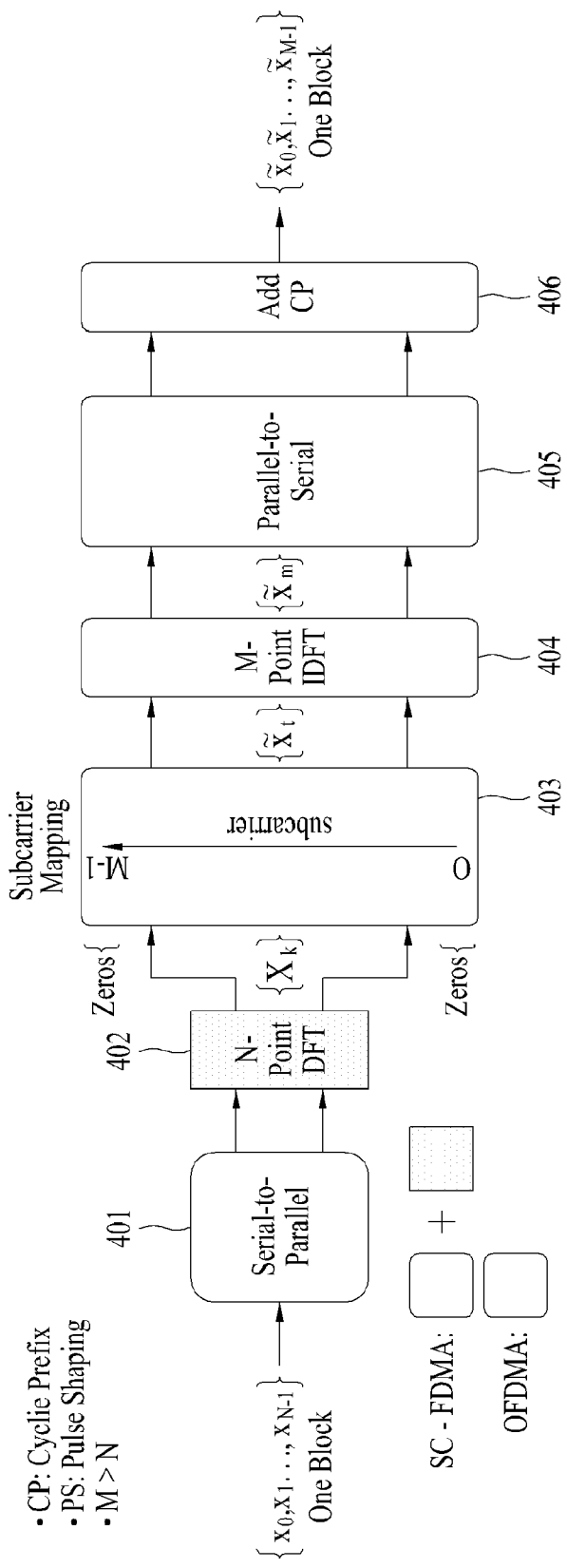
FIG. 5 illustrates SC-FDMA and OFDMA.

FIG. 5 illustrates SC-FDMA and OFDMA, to which the present invention is applied. The 3GPP system uses OFDMA on downlink and SC-FDMA on uplink.

Referring to FIG. 5, a UE for uplink signal transmission and a BS for downlink signal transmission commonly have a serial-to-parallel converter 401, a subcarrier mapper 403, an M-point Inverse Discrete Fourier Transform (IDFT) module 404, and a Cyclic Prefix (CP) addition module 406. Nonetheless, the UE further includes an N-point Discrete Fourier Transform (DFT) module 402 to transmit an uplink signal in SC-FDMA. The N-point DFT module 402 partially offsets the effects of IDFT performed by the M-point IDFT module 404 so that a transmission uplink signal may have a single carrier property.

FIG. 6 illustrates examples of mapping input symbols to subcarriers in the frequency domain while satisfying the single carrier property. FIG. 6(a) illustrates localized mapping and FIG. 6(b) illustrates distributed mapping.

Clustered SC-FDMA which is a modified version of SC-FDMA will now be described. In clustered SC-FDMA, DFT processed output samples are divided into sub-groups and the sub-groups are discontinuously mapped in the frequency domain (or subcarrier domain), during a subcarrier mapping process.

Figure 7:
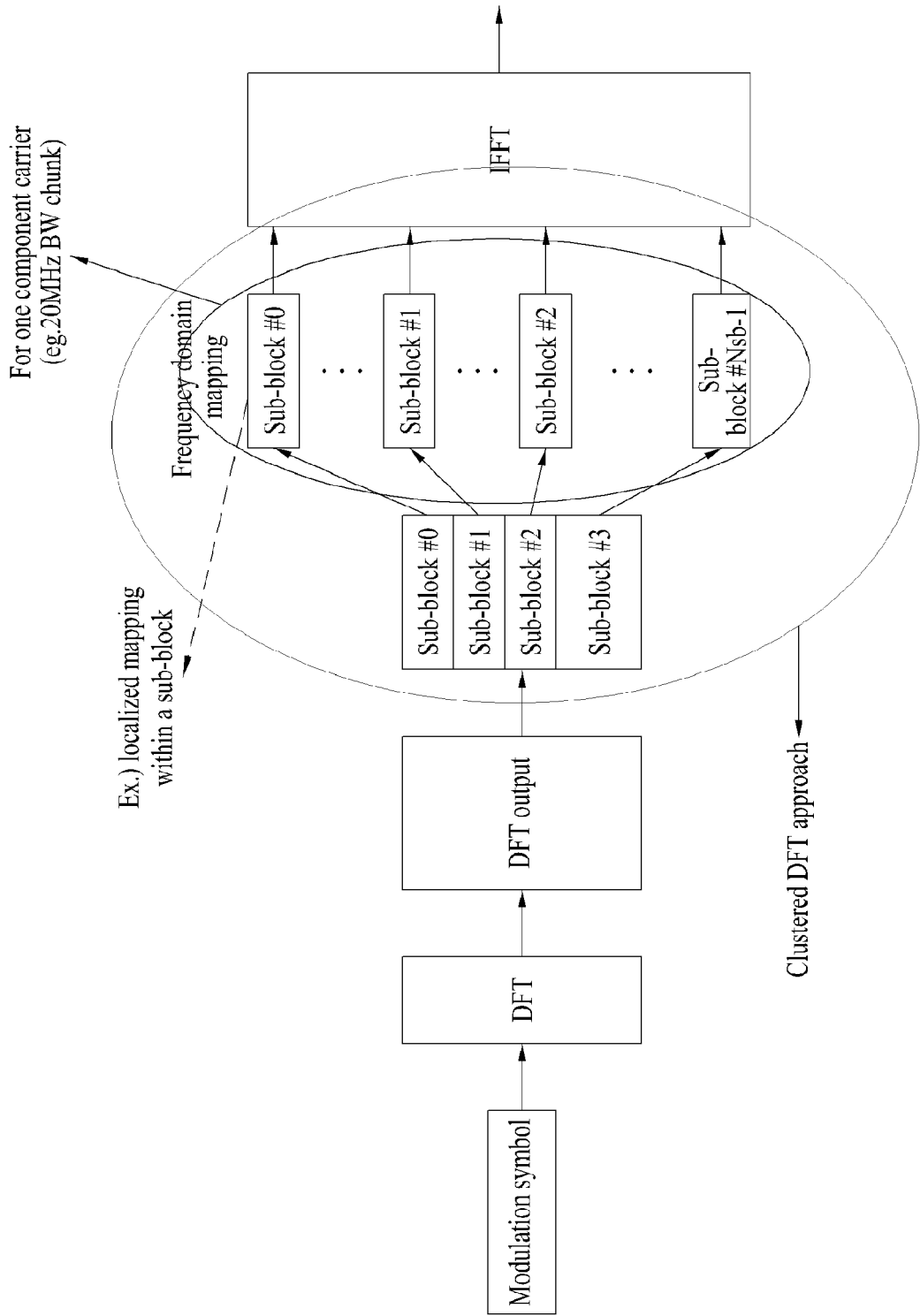
FIG. 7 illustrates a signal processing operation for mapping DFT processed samples to a single carrier in clustered SC-FDMA.
Figure 8:
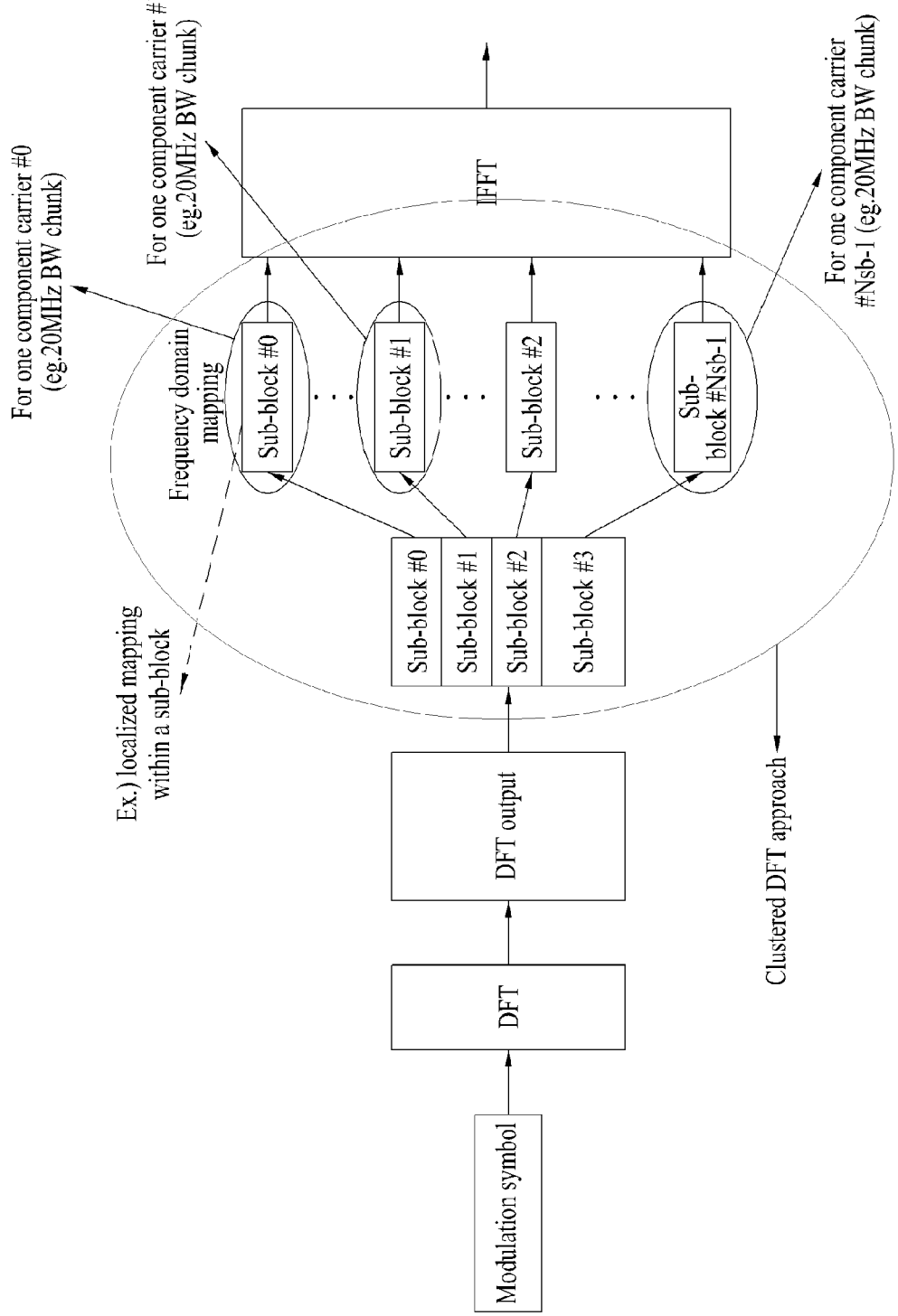
FIGS. 8 and 9 illustrate signal processing operations for mapping DFT processed samples to multiple carriers in clustered SC-FDMA.
Figure 9:
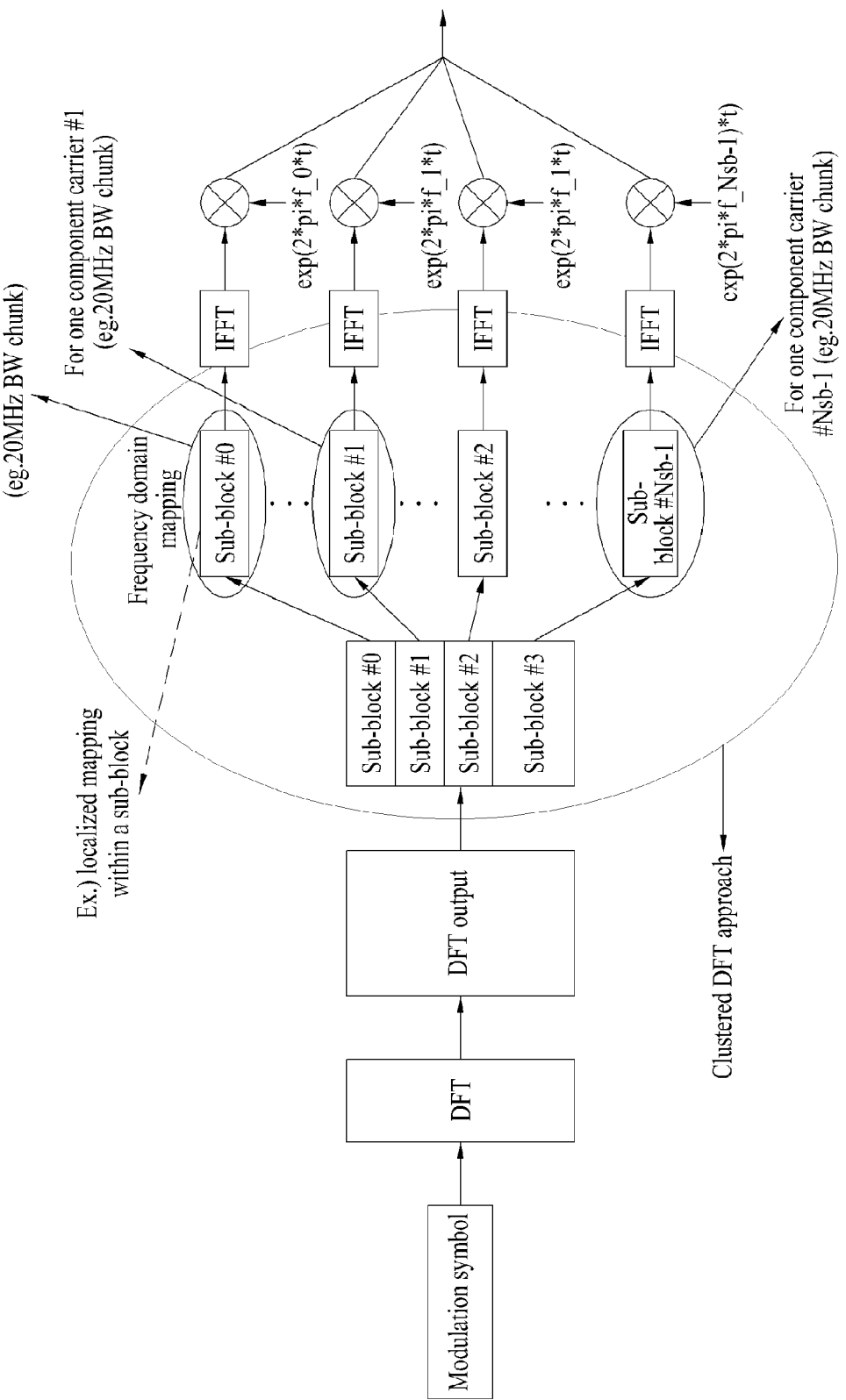

FIG. 7 illustrates an operation for mapping DFT processed samples to a single carrier in clustered SC-FDMA. FIGS. 8 and 9 illustrate operations for mapping DFT processed samples to multiple carriers in clustered SC-FDMA. FIG. 7 illustrates the application of intra-carrier clustered SC-FDMA, whereas FIGS. 8 and 9 illustrate the application of inter-carrier clustered SC-FDMA. FIG. 8 illustrates signal generation through a single IFFT block in the case of alignment of a subcarrier spacing between contiguous subcarriers in a situation in which Component Carriers (CCs) are contiguously allocated in the frequency domain. FIG. 9 illustrates signal generation through a plurality of IFFT blocks in a situation in which CCs are non-contiguously allocated in the frequency domain.

Figure 10:
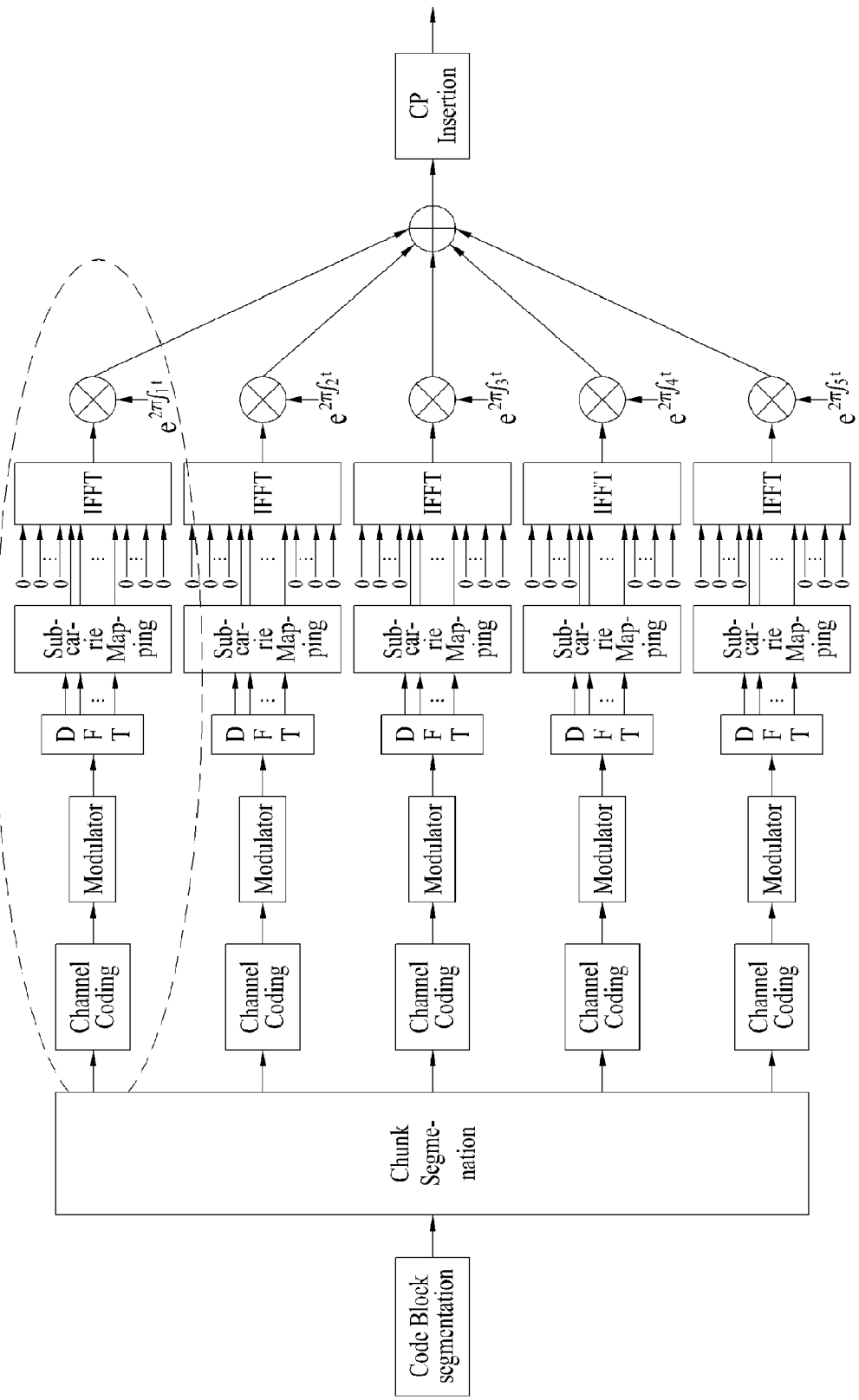
FIG. 10 illustrates a signal processing operation in segmented SC-FDMA.

FIG. 10 illustrates a signal processing operation in segmented SC-FDMA.

As the number of DFT blocks is equal to the number of IFFT blocks and thus the DFT blocks and the IFFT blocks are in a one-to-one correspondence, segmented SC-FDMA is a simple extension of the DFT spreading and IFFT subcarrier mapping structure of conventional SC-FDMA and may be expressed as NxSC-FDMA or NxDFT-s-OFDMA. In this disclosure, segmented SC-FDMA includes all these terms. Referring to FIG. 9, in segmented SC-FDMA, all modulation symbols in the time domain are divided into N groups (where N is an integer greater than 1) and subjected to a DFT process in units of a group in order to relieve single carrier property constraints.

Figure 11:
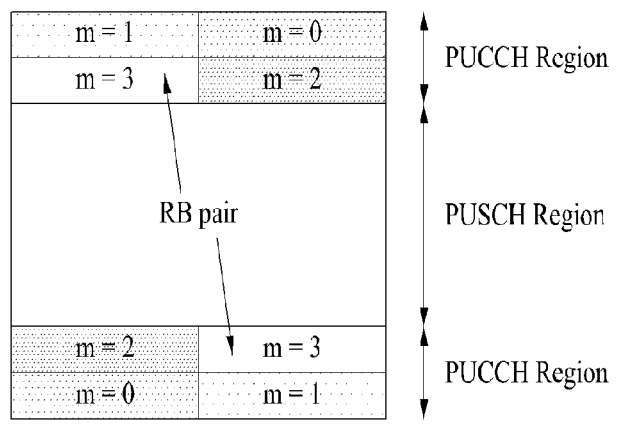
FIG. 11 illustrates an uplink subframe structure.

FIG. 11 illustrates an uplink subframe structure.

Referring to FIG. 11, an uplink subframe includes multiple (e.g. two) slots. A slot may include a different number of SC-FDMA symbols according to the length of a CP. For example, in case of a normal CP, a slot may include 7 SC-FDMA symbols. The uplink subframe is divided into a data region and a control region. The data region includes a PUSCH region and is used to transmit data signals such as voice signals. The control region includes a PUCCH region and is used to transmit control information. The PUCCH includes an RB pair (e.g. RB pair of a frequency mirrored location, m=0, 1, 2, 3) located at both ends of the data region on the frequency domain and the RB pair is hopped on a slot basis. UCI includes an HARQ ACK/NACK, a CQI, a PMI, and an RI.

Figure 12:
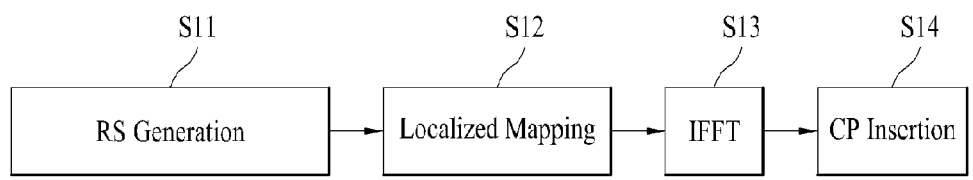
FIG. 12 illustrates a signal processing procedure for transmitting an RS on uplink.

FIG. 12 illustrates a signal processing procedure for transmitting an RS on uplink. While data is converted into a frequency-domain signal through a DFT processor, is mapped to a signal on subcarriers, and then is transmitted through IFFT, an RS is generated without passing through the DFT precoder. Specifically, an RS sequence is directly generated (S11) in the frequency domain and then the RS is transmitted through sequential processes of localized mapping (S12), IFFT (S13), and CP insertion (S14).

RS sequence $r_{u,v}^{(\alpha)}(n)$ is defined by a cyclic shift $\alpha$ of a base sequence $\bar{r}_{u,v}(n)$, and may be expressed as Equation 1.

$$r_{u,v}^{(\alpha)}(n) = e^{j\alpha n} \bar{r}_{u,v}(n), 0 \leq n < M_{sc}^{RS} \qquad \text{[Equation 1]}$$

Here, $M_{sc}^{RS} = mN_{sc}^{RB}$ the length of the reference signal sequence, $N_{sc}^{RB}$ is Resource block size, expressed as a number of subcarriers, and $1 \leq m \leq N_{RB}^{max,UL}$. $N_{RB}^{max,UL}$ is a maximum uplink bandwidth.

Base sequences $\bar{r}_{u,v}(n)$ are divided into groups, where $u \in \{0, 1, \ldots, 29\}$ is the group number and v is the base sequence number within the group, such that each group contains one base sequence (v=0) of each length $M_{sc}^{RS} = mN_{sc}^{RB}$, $1 \leq m \leq 5$ and two base sequences (v=0,1) of each length $M_{sc}^{RS} = mN_{sc}^{RB}$, $6 \leq m \leq N_{RB}^{max,UL}$. The sequence group number u and the number v within the group may vary in time as described in Sections 5.5.1.3 and 5.5.1.4, respectively. The definition of the base sequence $\bar{r}_{u,v}(0), \ldots, \bar{r}_{u,v}(M_{sc}^{RS}-1)$ depends on the sequence length $M_{sc}^{RS}$.

Base sequences of length $3N_{sc}^{RB}$ or larger may be defined as follows.

For $M_{sc}^{RS} \geq 3N_{sc}^{RB}$, the base sequence $\bar{r}_{u,v}(0), \ldots, \bar{r}_{u,v}(M_{sc}^{RS}-1)$ is given by Equation 2.

$$\bar{r}_{u,v}(n) = x_q(n \bmod N_{ZC}^{RS}), 0 \leq n < M_{sc}^{RS} \qquad \text{[Equation 2]}$$

The $q^{th}$ root Zadoff-Chu sequence may be defined by Equation 3.

$$x_q(m) = e^{-j\frac{\pi q m(m+1)}{N_{ZC}^{RS}}}, 0 \leq m \leq N_{ZC}^{RS} - 1 \qquad \text{[Equation 3]}$$

where q satisfies the following Equation 4.

$$q = \lfloor \bar{q} + 1/2 \rfloor + v \cdot (-1)^{\lfloor \bar{q} \rfloor}$$

$$\bar{q} = N_{ZC}^{RS} \cdot (u+1)/31 \qquad \text{[Equation 4]}$$

The length $N_{ZC}^{RS}$ of the Zadoff-Chu sequence is given by the largest prime number such that $N_{ZC}^{RS} < M_{sc}^{RS}$.

Base sequences of length less than $3N_{sc}^{RB}$ may be defined as follows. For $M_{sc}^{RS} = N_{sc}^{RB}$ and $M_{sc}^{RS} = 2N_{sc}^{RB}$, base sequence is given by Equation 5.

$$\bar{r}_{u,v}(n) = e^{j\phi(n)\pi/4}, 0 \leq n \leq M_{sc}^{RS}-1 \qquad \text{[Equation 5]}$$

where the value of $\phi(n)$ is given by the following Table 1 and Table 2 for $M_{sc}^{RS} = N_{sc}^{RB}$ and $M_{sc}^{RS} = 2N_{sc}^{RB}$, respectively.

TABLE 1

| u | $\phi(0), \ldots, \phi(11)$ | | | | | | | | | | | |
|---|---|---|---|---|---|---|---|---|---|---|---|---|
| 0 | −1 | 1 | 3 | −3 | 3 | 3 | 1 | 1 | 3 | 1 | −3 | 3 |
| 1 | 1 | 1 | 3 | 3 | 3 | −1 | 1 | −3 | −3 | 1 | −3 | 3 |
| 2 | 1 | 1 | −3 | −3 | −3 | −1 | −3 | −3 | 1 | −3 | 1 | −1 |
| 3 | −1 | 1 | 1 | 1 | 1 | −1 | −3 | −3 | 1 | −3 | 3 | −1 |
| 4 | −1 | 3 | 1 | −1 | 1 | −1 | −3 | −1 | 1 | −1 | 1 | 3 |
| 5 | 1 | −3 | 3 | −1 | −1 | 1 | 1 | −1 | −1 | 3 | −3 | 1 |
| 6 | −1 | 3 | −3 | −3 | −3 | 3 | 1 | −1 | 3 | 3 | −3 | 1 |
| 7 | −3 | −1 | −1 | −1 | 1 | −3 | 3 | −1 | 1 | −3 | 3 | 1 |
| 8 | 1 | −3 | 3 | 1 | −1 | −1 | −1 | 1 | 1 | 3 | −1 | 1 |
| 9 | 1 | −3 | −1 | 3 | 3 | −1 | −3 | 1 | 1 | 1 | 1 | 1 |
| 10 | −1 | 3 | −1 | 1 | 1 | −3 | −3 | −1 | −3 | −3 | 3 | −1 |
| 11 | 3 | 1 | −1 | −1 | 3 | 3 | −3 | 1 | 3 | 1 | 3 | 3 |
| 12 | 1 | −3 | 1 | 1 | −3 | 1 | 1 | 1 | −3 | −3 | −3 | 1 |
| 13 | 3 | 3 | −3 | 3 | −3 | 1 | 1 | 3 | −1 | −3 | 3 | 3 |
| 14 | −3 | 1 | −1 | −3 | −1 | 3 | 1 | 3 | 3 | 3 | −1 | 1 |
| 15 | 3 | −1 | 1 | −3 | −1 | −1 | 1 | 1 | 3 | 1 | −1 | −3 |
| 16 | 1 | 3 | 1 | −1 | 1 | 3 | 3 | 3 | −1 | −1 | 3 | −1 |
| 17 | −3 | 1 | 1 | 3 | −3 | 3 | −3 | −3 | 3 | 1 | 3 | −1 |
| 18 | −3 | 3 | 1 | 1 | −3 | 1 | −3 | −3 | −1 | −1 | 1 | −3 |
| 19 | −1 | 3 | 1 | 3 | 1 | −1 | −1 | 3 | −3 | −1 | −3 | −1 |
| 20 | −1 | −3 | 1 | 1 | 1 | 1 | 3 | 1 | −1 | 1 | −3 | −1 |
| 21 | −1 | 3 | −1 | 1 | −3 | −3 | −3 | −3 | −3 | 1 | −1 | −3 |
| 22 | 1 | 1 | −3 | −3 | −3 | −3 | −1 | 3 | −3 | 1 | −3 | 3 |
| 23 | 1 | 1 | −1 | −3 | −1 | −3 | 1 | −1 | 1 | 3 | −1 | 1 |

TABLE 1-continued

| u | φ(0), ..., φ(11) | | | | | | | | | | | |
|---|---|---|---|---|---|---|---|---|---|---|---|---|
| 24 | 1 | 1 | 3 | 1 | 3 | 3 | −1 | 1 | −1 | −3 | −3 | 1 |
| 25 | 1 | −3 | 3 | 3 | 1 | 3 | 3 | 1 | −3 | −1 | −1 | 3 |
| 26 | 1 | 3 | −3 | −3 | 3 | −3 | 1 | −1 | −1 | 3 | −1 | −3 |
| 27 | −3 | −1 | −3 | −1 | −3 | 3 | 1 | −1 | 1 | 3 | −3 | −3 |
| 28 | −1 | 3 | −3 | 3 | −1 | 3 | 3 | −3 | 3 | 3 | −1 | −1 |
| 29 | 3 | −3 | −3 | −1 | −1 | −3 | −1 | 3 | −3 | 3 | 1 | −1 |

TABLE 2

| u | φ(0), ..., φ(23) | | | | | | | | | | | | | | | | | | | | | | | |
|---|---|---|---|---|---|---|---|---|---|---|---|---|---|---|---|---|---|---|---|---|---|---|---|---|
| 0 | −1 | 3 | 1 | −3 | 3 | −1 | 1 | 3 | −3 | 3 | 1 | 3 | −3 | 3 | 1 | 1 | −1 | 1 | 3 | −3 | 3 | −3 | −1 | −3 |
| 1 | −3 | 3 | −3 | −3 | −3 | 1 | −3 | −3 | 3 | −1 | 1 | 1 | 1 | 3 | 1 | −1 | 3 | −3 | −3 | 1 | 3 | 1 | 1 | −3 |
| 2 | 3 | −1 | 3 | 3 | 1 | 1 | −3 | 3 | 3 | 3 | 3 | 1 | −1 | 3 | 1 | −1 | −3 | −1 | −1 | 1 | 3 | 3 |
| 3 | −1 | −3 | 1 | 1 | 3 | −3 | 1 | 1 | −3 | −1 | −1 | 1 | 3 | 1 | 3 | 1 | −1 | 3 | 1 | 1 | −3 | −1 | −3 | −1 |
| 4 | −1 | −1 | −1 | −3 | −3 | −1 | 1 | 1 | 3 | 3 | −1 | 3 | −1 | 1 | −1 | −3 | 1 | −1 | −3 | −3 | 1 | −1 | −1 | −1 |
| 5 | −3 | 1 | 1 | 3 | −1 | 1 | 3 | 1 | −3 | 1 | −3 | 1 | 1 | −1 | −1 | 3 | −1 | −3 | 3 | −3 | −3 | −3 | 1 | 1 |
| 6 | 1 | 1 | −1 | −1 | 3 | −3 | −3 | 3 | −3 | 1 | −1 | −1 | 1 | −1 | 1 | 1 | −1 | 3 | −1 | 1 | −3 |
| 7 | −3 | 3 | 3 | −1 | −1 | −3 | −1 | 3 | 1 | 3 | 1 | 3 | 1 | 1 | −1 | 3 | 1 | −1 | 1 | 3 | −3 | −1 | −1 | 1 |
| 8 | −3 | 1 | 3 | −3 | 1 | −1 | −3 | 3 | −3 | 3 | −1 | −1 | −1 | −1 | 1 | −3 | −3 | −3 | 1 | −3 | −3 | −3 | 1 | −3 |
| 9 | 1 | 1 | −3 | 3 | 3 | −1 | −3 | −1 | 3 | −3 | 3 | 3 | 3 | −1 | 1 | 1 | −3 | 1 | −1 | 1 | 1 | −3 | 1 | 1 |
| 10 | −1 | 1 | −3 | −3 | 3 | −1 | 3 | −1 | −1 | −3 | −3 | −3 | −1 | −3 | −3 | 1 | −1 | 1 | 3 | 3 | −1 | 1 | −1 | 3 |
| 11 | 1 | 3 | 3 | −3 | −3 | 1 | 3 | 1 | −3 | −3 | −3 | 3 | 3 | −3 | 3 | 3 | −1 | −3 | 3 | −1 | 1 | −3 | 1 |
| 12 | 1 | 3 | 3 | 1 | 1 | 1 | −1 | −1 | 1 | −3 | 3 | −1 | 1 | 1 | −3 | 3 | 3 | −1 | −3 | 3 | −3 | −1 | −3 | −1 |
| 13 | 3 | −1 | −1 | −1 | −1 | −3 | −1 | 3 | 3 | 1 | −1 | 1 | 3 | 3 | 3 | −1 | 1 | 1 | −3 | 1 | 3 | −1 | −3 | 3 |
| 14 | −3 | −3 | 3 | 1 | 3 | 1 | −3 | 3 | 1 | 3 | 1 | 1 | 3 | 3 | −1 | −1 | −3 | 1 | −3 | −1 | 3 | 1 | 1 | 3 |
| 15 | −1 | −1 | 1 | −3 | 1 | 3 | −3 | 1 | −1 | −3 | −1 | 3 | 1 | 3 | 1 | −1 | −3 | −3 | −1 | −1 | −3 | −3 | −3 | −1 |
| 16 | −1 | −3 | 3 | −1 | −1 | −1 | −1 | 1 | 1 | −3 | 3 | 1 | 3 | 3 | 1 | −1 | 1 | −3 | 1 | −3 | 1 | 1 | −3 | −1 |
| 17 | 1 | 3 | −1 | 3 | 3 | −1 | −3 | 1 | −1 | −3 | 3 | 3 | 3 | −1 | 1 | 1 | 3 | −1 | −3 | −1 | 3 | −1 | −1 | −1 |
| 18 | 1 | 1 | 1 | 1 | 1 | −1 | 3 | −1 | −3 | 1 | 1 | 3 | −3 | 1 | −3 | −1 | 1 | 1 | −3 | −3 | 3 | 1 | 1 | −3 |
| 19 | 1 | 3 | 3 | 1 | −1 | −3 | 3 | −1 | 3 | 3 | 3 | −3 | 1 | −1 | 1 | −1 | −3 | −1 | 1 | 3 | −1 | 3 | −3 | −3 |
| 20 | −1 | −3 | 3 | −3 | −3 | −3 | −1 | −1 | −3 | −1 | −3 | 3 | 1 | 3 | −3 | −1 | 3 | −1 | 1 | −1 | 3 | −3 | 1 | −1 |
| 21 | −3 | −3 | 1 | 1 | −1 | 1 | −1 | 1 | −1 | 3 | 1 | −3 | −1 | 1 | −1 | 1 | −1 | −1 | 3 | 3 | −3 | −1 | 1 | −3 |
| 22 | −3 | −1 | −3 | 3 | 1 | −1 | −3 | −1 | −3 | −3 | 3 | −3 | 3 | −3 | −1 | 1 | 3 | 1 | −3 | 1 | 3 | 3 | −1 | −3 |
| 23 | −1 | −1 | −1 | −1 | 3 | 3 | 3 | 1 | 3 | 3 | −3 | 1 | 3 | −1 | 3 | −1 | 3 | 3 | −3 | 3 | 1 | −1 | 3 | 3 |
| 24 | 1 | −1 | 3 | 3 | −1 | −3 | 3 | −3 | −1 | −1 | 3 | −1 | 3 | −1 | −1 | 1 | 1 | 1 | 1 | −1 | −1 | −3 | −1 | 3 |
| 25 | 1 | −1 | 1 | −1 | 3 | −1 | 3 | 1 | 1 | −1 | −1 | −3 | 1 | 1 | −3 | 1 | 3 | −3 | 1 | 1 | −3 | −3 | −1 | −1 |
| 26 | −3 | −1 | 1 | 3 | 1 | 1 | −3 | −1 | −1 | −3 | 3 | −3 | 3 | 1 | −3 | 3 | −3 | 1 | −1 | 1 | −3 | 1 | 1 | 1 |
| 27 | −1 | −3 | 3 | 3 | 1 | 1 | 3 | −1 | −3 | −1 | −1 | −1 | 3 | 1 | −3 | −3 | 1 | 3 | −1 | −3 | −1 | −3 | −1 | −3 |
| 28 | −1 | −3 | −1 | −1 | 1 | −3 | −1 | −1 | 1 | −1 | −3 | 1 | 1 | −3 | 1 | −3 | −3 | 3 | 1 | 1 | −1 | 3 | −1 | −1 |
| 29 | 1 | 1 | −1 | −1 | −3 | −1 | 3 | −1 | 3 | −1 | 1 | 3 | 1 | −1 | 3 | 1 | 3 | −3 | −3 | 1 | −1 | −1 | 1 | 3 |

In the meantime, RS hopping is described as follows.

The sequence-group number u in slot $n_s$ may be defined by a group hopping pattern $f_{gh}(n_s)$ and a sequence-shift pattern $f_{ss}$ according to the following Equation 6.

$$u = (f_{gh}(n_s) + f_{ss}) \bmod 30 \quad \text{[Equation 6]}$$

where "mod" denotes the modulo operation.

There are 17 different hopping patterns and 30 different sequence-shift patterns. Sequence-group hopping can be enabled or disabled by means of the cell-specific parameter provided by higher layers.

PUCCH and PUSCH have the same hopping pattern but may have different sequence-shift patterns.

The group-hopping pattern $f_{gh}(n_s)$ is the same for PUSCH and PUCCH and given by the following Equation 7.

$$f_{gh}(n_s) = \begin{cases} 0 & \text{if group hopping is disabled} \\ \left(\sum_{i=0}^{7} c(8n_s + i) \cdot 2^i\right) \bmod 30 & \text{if group hopping is enabled} \end{cases} \quad \text{[Equation 7]}$$

where c(i) is the pseudo-random sequence. The pseudo-random sequence generator may be initialized with $$c_{init} = \left\lfloor \frac{N_{ID}^{cell}}{30} \right\rfloor$$

at the beginning of each radio frame.

The sequence-shift pattern $f_{ss}$ definition differs between PUCCH and PUSCH.

For PUCCH, the sequence-shift pattern $f_{ss}^{PUCCH}$ is given by $f_{ss}^{PUCCH} = N_{ID}^{cell} \bmod 30$. For PUSCH, the sequence-shift pattern $f_{ss}^{PUSCH}$ is given by $f_{ss}^{PUSCH} = (f_{ss}^{PUCCH} + \Delta_{ss}) \bmod 30$, where $\Delta_{ss} \in \{0, 1, \ldots, 29\}$ is configured by higher layers.

Hereinafter, sequence hopping is described.

Sequence hopping only applies for reference-signals of length $M_{sc}^{RS} \geq 6N_{sc}^{RB}$.

For reference-signals of length $M_{sc}^{RS} < 6N_{sc}^{RB}$, the base sequence number v within the base sequence group is given by v=0.

For reference-signals of length $M_{sc}^{RS} \geq 6N_{sc}^{RB}$, the base sequence number v within the base sequence group in slot $n_s$ is given by the following Equation 8.

$$v = \begin{cases} c(n_s) & \text{if group hopping is disabled and} \\ & \text{sequence hopping is enabled} \\ 0 & \text{otherwise} \end{cases} \quad \text{[Equation 8]}$$

where c(i) is the pseudo-random sequence, and the parameter provided by higher layers determines if sequence hopping is enabled or not. The pseudo-random sequence generator may be initialized with $$c_{init} = \left\lfloor \frac{N_{ID}^{cell}}{30} \right\rfloor \cdot 2^5 + f_{ss}^{PUSCH}$$

at the beginning of each radio frame.

The reference signals for PUSCH are determined as follows.

The reference signal sequence $r^{PUSCH}(\cdot)$ for PUSCH is defined by $$r^{PUSCH}(m \cdot M_{sc}^{RS} + n) = r_{u,v}^{(\alpha)}(n)$$

$$\text{where } \begin{array}{l} m = 0, 1 \\ n = 0, \ldots, M_{sc}^{RS} - 1 \end{array}$$

and $M_{sc}^{RS} = M_{sc}^{PUSCH}$.

The cyclic shift α in a slot $n_s$ is given as $\alpha = 2\pi n_{cs}/12$ with $n_{cs} = (n_{DMRS}^{(1)} + n_{DMRS}^{(2)} + n_{PRS}(n_s)) \bmod 12$.

$n_{DMRS}^{(1)}$ is a value broadcasted, $n_{DMRS}^{(2)}$ is given by uplink scheduling assignment, $n_{PRS}(n_s)$ is a cell-specific cyclic shift value. $n_{PRS}(n_s)$ varies depending on a slot number $n_s$ and given by $n_{PRS}(n_s) = \Sigma_{i=0}^{7} c(8 \cdot n_s + i) \cdot 2^i$.

c(i) is the pseudo-random sequence and cell-specific. The pseudo-random sequence generator may be initialized with $$c_{init} = \left\lfloor \frac{N_{ID}^{cell}}{30} \right\rfloor \cdot 2^5 + f_{ss}^{PUSCH}$$

at the beginning of each radio frame.

Table 3 shows Cyclic Shift Field in downlink control information (DCI)) format 0 and $n_{DMRS}^{(2)}$.

TABLE 3

| Cyclic Shift Field in DCI format 0 | $n_{DMRS}^{(2)}$ |
|---|---|
| 000 | 0 |
| 001 | 2 |
| 010 | 3 |
| 011 | 4 |
| 100 | 6 |
| 101 | 8 |
| 110 | 9 |
| 111 | 10 |

Uplink RS for PUSCH is mapped according to the following method.

The sequence is multiplied with the amplitude scaling factor $\beta_{PUSCH}$ and mapped in sequence starting with $r_{PUSCH}(0)$ to the set of physical resource blocks (PRBs) that is identical to that used for a corresponding PUSCH. The mapping to resource elements (k,l), with l=3 for normal cyclic prefix and l=2 for extended cyclic prefix, in the subframe is in increasing order of first k, then the slot number.

In summary, if length is $3N_{sc}^{RB}$ or more, a ZC sequence is used with cyclic extension and, if length is less than $3N_{sc}^{RB}$, a computer generated sequence is used A cyclic shift is determined according to cell-specific cyclic shift, UE-specific cyclic shift, and hopping pattern.

Figure 13:
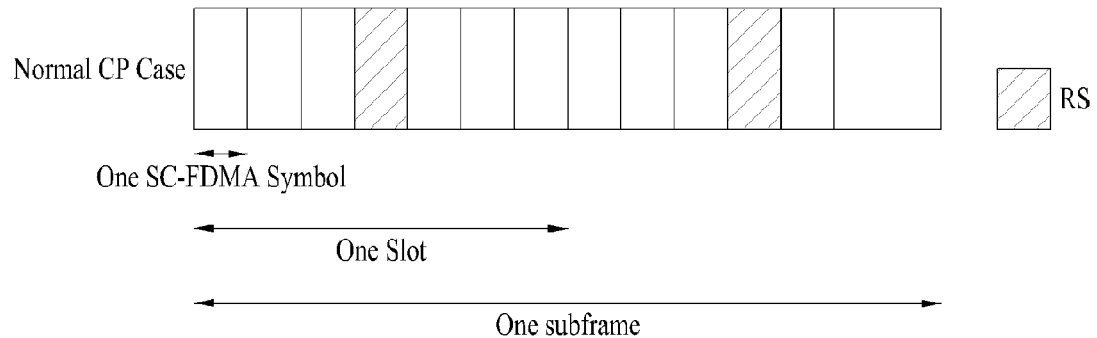
FIGS. 13 and 14 illustrate DMRS structures for a PUSCH.
Figure 14:
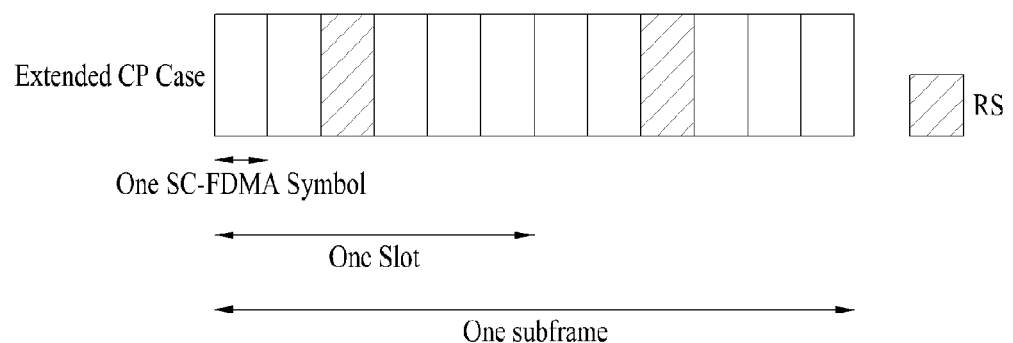

FIG. 13 shows a DeModulation Reference Signal (DMRS) structure for a PUSCH in case of a normal CP and FIG. 14 shows a DMRS structure for a PUSCH in case of an extended CP. A DMRS is transmitted through the fourth and eleventh SC-FDMA symbols in FIG. 13 and transmitted through the third and ninth SC-FDMA symbols in FIG. 14.

FIGS. 15 to 18 illustrate slot level structures of PUCCH formats. A PUCCH has the following formats in order to transmit control information.

(1) PUCCH Format 1: used for On-Off Keying (OOK) modulation and a Scheduling Request (SR).

(2) PUCCH Formats 1a and 1b: used for transmitting ACK/NACK information.

1) PUCCH Format 1a: ACK/NACK information modulated by BPSK for one codeword.

2) PUCCH Format 1b: ACK/NACK information modulated by QPSK for two codewords.

(3) PUCCH Format 2: modulated by QPSK and used for Channel Quality Indicator (CQI) transmission.

(4) PUCCH Formats 2a and 2b: used for simultaneous transmission of a CQI and ACK/NACK information.

Table 4 lists modulation schemes and numbers of bits per subframe for PUCCH formats and Table 5 lists numbers of Reference Signals (RSs) per slot for PUCCH formats. Table 6 lists SC-FDMA symbol positions of RSs for PUCCH formats. In Table 4, PUCCH Formats 2a and 2b correspond to the case of a normal CP.

TABLE 4

| PUCCH Format | Modulation | Number of Bits per Subframe, $M_{bit}$ |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

TABLE 5

| PUCCH Format | Normal CP | Extended CP |
|---|---|---|
| 1, 1a, 1b | 3 | 2 |
| 2 | 2 | 1 |
| 2a, 2b | 2 | N/A |

TABLE 6

| | SC-FDMA Symbol Position of RS | |
|---|---|---|
| PUCCH Format | Normal CP | Extended CP |
| 1, 1a, 1b | 2, 3, 4 | 2, 3 |
| 2, 2a, 2b | 1, 5 | 3 |

FIG. 15 illustrates PUCCH Formats 1a and 1b in case of normal cyclic prefix, and FIG. 16 illustrates PUCCH Formats 1a and 1b in case of extended cyclic prefix. The same UCI is repeated on a slot basis in a subframe in PUCCH Format 1a and 1b. A UE transmits ACK/NACK signals through different resources of different Cyclic Shifts (CSs) (a frequency-domain code) of a Computer-Generated Constant Amplitude Zero Auto Correlation (CG-CAZAC) sequence and an Orthogonal Cover (OC) or Orthogonal Cover Code (OCC) (a time-domain spreading code). The OC includes, for example, a Walsh/DFT orthogonal code. If the number of CSs is 6 and the number of OCs is 3, a total of 18 UEs may be multiplexed in the same Physical Resource Block (PRB) based on a single antenna. An OC sequence w0, w1, w2 and w3 is applicable to a time domain (after FFT modulation) or to a frequency domain (before FFT modulation). PUCCH Format 1 for transmitting SR information is the same as PUCCH Formats 1a and 1b in slot-level structure and different from PUCCH Formats 1a and 1b in modulation scheme.

ACK/NACK resources comprised of a CS, an OC, and a PRB may be allocated to a UE by Radio Resource Control (RRC) signaling, for SR and Semi-Persistent Scheduling (SPS). ACK/NACK resources may be implicitly allocated to a UE using the lowest CCE index of a PDCCH corresponding to a PDSCH, for dynamic ACK/NACK or non-persistent scheduling.

FIG. 17 illustrates PUCCH Format 2/2a/2b in case of a normal CP and FIG. 18 illustrates PUCCH Format 2/2a/2b in case of an extended CP. Referring to FIGS. 17 and 18, one subframe includes 10 QPSK symbols except for an RS symbol in case of a normal CP. Each QPSK symbol is spread with a CS in the frequency domain and then mapped to a corresponding SC-FDMA symbol. SC-FDMA symbol-level CS hopping may be applied to randomize inter-cell interference. An RS may be multiplexed by Code Division Multiplexing (CDM) using a CS. For example, if the number of available CSs is 12 or 6, 12 or 6 UEs may be multiplexed in the same PRB. That is, a plurality of UEs may be multiplexed using CS+OC+PRB and CS+PRB in PUCCH Formats 1/1a/1b and 2/2a/2b, respectively.

Length-4 and length-3 OCs for PUCCH Format 1/1a/1b are illustrated in Table 7 and Table 8 below.

TABLE 7

Length-4 orthogonal sequences for PUCCH formats 1/1a/1b

| Sequence index $n_{oc}(n_s)$ | Orthogonal sequences $[w(0) \ldots w(N_{SF}^{PUCCH} - 1)]$ |
|---|---|
| 0 | [+1 +1 +1 +1] |
| 1 | [+1 −1 +1 −1] |
| 2 | [+1 −1 −1 +1] |

TABLE 8

Length-3 orthogonal sequences for PUCCH formats 1/1a/1b

| Sequence index $n_{oc}(n_s)$ | Orthogonal sequences $[w(0) \ldots w(N_{SF}^{PUCCH} - 1)]$ |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

OCs for RSs in PUCCH Format 1/1a/1b are given in Table 9 below.

TABLE 9

| | 1a and 1b | |
|---|---|---|
| Sequence index $n_{oc}(n_s)$ | Normal cyclic prefix | Extended cyclic prefix |
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

FIG. 19 illustrates ACK/NACK channelization for PUCCH Formats 1a and 1b. In FIG. 19, $\Delta_{shift}^{PUCCH}=2$.

FIG. 20 illustrates channelization for a hybrid structure of PUCCH Format 1/1a/1b and PUCCH Format 2/2a/2b in the same PRB.

CS hopping and OC re-mapping may be applied as follows.

(1) Symbol-based cell-specific CS hopping for randomization of inter-cell interference (2) Slot-level CS/OC re-mapping 1) For randomization of inter-cell interference 2) Slot-based approach for mapping between an ACK/NACK channel and a resources Meanwhile, a resource $n_r$ for PUCCH Format 1/1a/1b includes the following combinations.

(1) CS (identical to DFT OC in symbol level) ($n_{cs}$)

(2) OC (OC in slot level) ($n_{oc}$)

(3) Frequency RB ($n_{rb}$)

Assuming that indexes of a CS, an OC, and an RB are denoted by $n_{cs}$, $n_{oc}$, and $n_{rb}$, respectively, a representative index $n_r$ includes $n_{cs}$, $n_{oc}$, and $n_{rb}$ where $n_r$ satisfies $n_r=(n_{cs}, n_{oc}, n_{rb})$.

A combination of an ACK/NACK and a CQI, PMI and RI, and a combination of an ACK/NACK and a CQI may be delivered through PUCCH Format 2/2a/2b. Reed Muller (RM) channel coding may be applied.

For example, channel coding for an uplink CQI in the LTE system is described as follows. A bit stream $a_0, a_1, a_2, a_3, \ldots, a_{A-1}$ is channel coded using a (20, A) RM code. Table 10 lists base sequences for the (20, A) code. $a_0$ and $a_{A-1}$ denote the Most Significant Bit (MSB) and Least Significant Bit (LSB), respectively. In case of an extended CP, up to 11 bits can be transmitted except for simultaneous transmission of a CQI and an ACK/NACK. A bit stream may be encoded to 20 bits using an RM code and then modulated by QPSK. Before QPSK modulation, the coded bits may be scrambled.

TABLE 10

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |

TABLE 10-continued

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

Channel-coded bits $b_0, b_1, b_2, b_3, \ldots, b_{B-1}$ may be generated by Equation 9.

$$b_i = \sum_{n=0}^{A-1} (o_n \cdot M_{i,n}) \bmod 2 \qquad \text{[Equation 9]}$$

where $i = 0, 1, 2, \ldots, B-1$.

Table 11 illustrates a UCI field for feedback of a wideband report (a single antenna port, transmit diversity, or open loop spatial multiplexing PDSCH) CQI.

TABLE 11

| Field | Bandwidth |
|---|---|
| Wideband CQI | 4 |

Table 12 illustrates a UCI field for feedback of a wideband CQI and a PMI. This field reports transmission of a closed loop spatial multiplexing PDSCH.

TABLE 12

| | Bandwidth | | | |
|---|---|---|---|---|
| | 2 antenna ports | | 4 antenna ports | |
| Field | Rank = 1 | Rank = 2 | Rank = 1 | Rank > 1 |
| wideband CQI | 4 | 4 | 4 | 4 |
| Spatial differential CQI | 0 | 3 | 0 | 3 |
| PMI | 2 | 1 | 4 | 4 |

Table 13 illustrates a UCI field for RI feedback for a wideband report.

TABLE 13

| | Bit widths | | |
|---|---|---|---|
| | | 4 antenna ports | |
| Field | 2 antenna ports | Up to 2 layers | Up to 4 layers |
| RI | 1 | 1 | 2 |

FIG. 21 illustrates PRB allocation. Referring to FIG. 21, a PRB may be used to carry a PUCCH in slot $n_s$.

A multi-carrier system or Carrier Aggregation (CA) system is a system using a plurality of carriers each having a narrower bandwidth than a target bandwidth in order to support a broadband. When a plurality of carriers each having a narrower bandwidth than a target bandwidth is aggregated, the bandwidth of the aggregated carriers may be limited to a bandwidth used in a legacy system in order to ensure backward compatibility with the legacy system. For example, the legacy LTE system supports bandwidths of 1.4, 3, 5, 10, 15, and 20 MHz and an LTE-A system evolved from an LTE system may support a broader bandwidth than 20 MHz using only the bandwidths supported by the LTE system. Alternatively, CA may be supported by defining a new bandwidth irrespective of the bandwidths used in the legacy system. The term multi-carrier is interchangeably used with CA and bandwidth aggregation. In addition, CA includes both contiguous CA and non-contiguous CA.

FIG. 22 illustrates a concept of downlink (DL) CC management in a BS and FIG. 23 illustrates a concept of uplink (UL) CC management in a UE. For convenience of description, a higher layer will be simply referred to as a MAC in FIGS. 22 and 23.

FIG. 24 illustrates a concept of multi-carrier management of one MAC in a BS and FIG. 25 illustrates multi-carrier management of one MAC in a UE.

Referring to FIGS. 24 and 25, one MAC manages and operates one or more frequency carriers to perform transmission and reception. Since frequency carriers managed by a single MAC do not need to be contiguous, this multi-carrier management scheme is more flexible in terms of resource management. In FIGS. 24 and 25, one Physical layer (PHY) refers to one CC, for convenience of description. Here, one PHY does not always mean an independent Radio Frequency (RF) device. Although one independent RF device generally means one PHY, it may include a plurality of PHYs.

FIG. 26 illustrates a concept of multi-carrier management of a plurality of MACs in a BS, FIG. 27 illustrates a concept of multi-carrier management of a plurality of MACs in a UE, FIG. 28 illustrates another concept of multi-carrier management of a plurality of MACs in a BS, and FIG. 29 illustrates another concept of multi-carrier management of a plurality of MACs in a UE.

In addition to the structures illustrated in FIGS. 24 and 25, a plurality of MACs rather than one MAC may control a plurality of carriers, as illustrated in FIGS. 26 to 29.

Each MAC may control one carrier in a one-to-one correspondence as illustrated in FIGS. 26 and 27, whereas each MAC may control one carrier in a one-to-one correspondence, for some carriers and one MAC may control one or more of the remaining carriers as illustrated in FIGS. 28 and 29.

The above-described system uses a plurality of carriers from one to N carriers and the carriers may be contiguous or non-contiguous irrespective of downlink or uplink. A TDD system is configured to use N carriers such that downlink transmission and uplink transmission are performed on each carrier, whereas an FDD system is configured to use a plurality of carriers for each of downlink transmission and uplink transmission. The FDD system may support asymmetrical CA in which different numbers of carriers and/or carriers having different bandwidths are aggregated for downlink and uplink.

When the same number of CCs is aggregated for downlink and uplink, all CCs can be configured to be compatible with the legacy system. However, CCs without compatibility are not excluded from the present invention.

The following description will be given under the assumption that, when a PDCCH is transmitted through downlink component carrier #0, a PDSCH corresponding to the PDCCH is transmitted through the downlink component carrier #0. However, it is apparent that the corresponding PDSCH can be transmitted through another downlink component carrier by applying cross-carrier scheduling. The term "component carrier" may be replaced with other equivalent terms (e.g. cell).

FIG. 30 illustrates a scenario of transmitting UCI in a wireless communication system in which CA is supported. For convenience of description, it is assumed in this example that UCI is ACK/NACK (A/N). However, UCI may include control information such as Channel State Information (CSI) (e.g. CQI, PMI, and RI) and scheduling request information (e.g. SR), without restriction.

FIG. 30 illustrates exemplary asymmetrical CA in which five DL CCs are linked to a single UL CC. This asymmetrical CA may be set from the perspective of transmitting UCI. That is, DL CC-UL CC linkage for UCI may be set to be different from DL CC-UL CC linkage for data. For the convenience, if it is assumed that each DL CC can carry up to two codewords and the number of ACKs/NACKs for each CC depends on the maximum number of codewords set per CC (for example, if a BS sets up to two codewords for a specific CC, even though a specific PDCCH uses only one codeword on the CC, ACKs/NACKs for the CC are set to 2 which is the same as the maximum number of codewords), at least two UL ACK/NACK bits are needed for each DL CC. In this case, to transmit ACKs/NACKs for data received on five DL CCs on a single UL CC, at least 10 ACK/NACK bits are needed. If a Discontinuous Transmission (DTX) state is also to be indicated for each DL CC, at least 12 bits ($=5^6=3125=11.61$ bits) are required for ACK/NACK transmission. Since up to two ACK/NACK bits are available in the conventional PUCCH Formats 1a and 1b, this structure cannot transmit increased ACK/NACK information. While CA is given as an example of a cause to increase the amount of UCI, this situation may also occur due to an increase in the number of antennas and the existence of a backhaul subframe in a TDD system and a relay system. Similarly to ACK/NACK transmission, the amount of control information to be transmitted is also increased when control information related to a plurality of DL CCs is transmitted on a single UL CC. For example, transmission of CQI/PMI/RI information related to a plurality of DL CCs may increase UCI payload.

A DL primary CC may be defined as a DL CC linked with a UL primary CC. Here, linkage includes both implicit linkage and explicit linkage. In LTE, one DL CC and one UL CC are uniquely paired. For example, a DL CC linked with a UL primary CC may be referred to as a DL primary CC, according to LTE pairing. This may be regarded as implicit linkage. Explicit linkage means that a network configures linkage in advance and may be RRC-signaled. In explicit linkage, a DL CC paired with a UL primary CC may be referred to as a DL primary CC. The UL primary (or anchor) CC may be a UL CC on which UCI is transmitted through a PUCCH or a PUSCH. The DL primary CC may be configured through higher layer signaling. Otherwise, the DL primary CC may be a DL CC initially accessed by a UE. DL CCs other than the DL primary CC may be referred to as DL secondary CCs. Similarly, UL CCs other than the UL primary CC may be referred to UL secondary CCs.

In LTE-A, the concept of a cell is used to manage radio resources. A cell is defined as a combination of downlink resources and uplink resources and the uplink resources are not indispensable elements. Therefore, a cell may be composed of downlink resources only or both downlink resources and uplink resources. If CA is supported, the linkage between the carrier frequencies (or DL CCs) of downlink resources and the carrier frequencies (or UL CCs) of uplink resources may be indicated by system information. A cell operating in primary frequency resources (or a PCC) may be referred to as a primary cell (PCell) and a cell operating in secondary frequency resources (or an SCC) may be referred to as a secondary cell (SCell). The PCell is used for a UE to establish an initial connection or re-establish a connection. The PCell may refer to a cell indicated during handover. The SCell may be configured after an RRC connection is established and may be used to provide additional radio resources. The PCell and the SCell may collectively be referred to as a serving cell. Accordingly, a single serving cell composed of a PCell only is present for a UE in an RRC_CONNECTED state, for which CA is not configured or which does not support CA. On the other hand, one or more serving cells are present, including a PCell and all SCells, for a UE in RRC_CONNECTED state, for which CA is configured. For CA, a network may configure one or more SCells in addition to an initially configured PCell, for a UE supporting CA during a connection setup procedure after an initial security activation procedure is initiated.

DL-UL pairing may correspond only to FDD. Since TDD uses the same frequency, DL-UL pairing need not be additionally defined with respect to TDD. DL-UL linkage may be determined from UL linkage through UL E-UTRA Absolute Radio Frequency Channel Number (EARFCN) information of SIB2. For example, DL-UL linkage may be acquired through SIB2 decoding during initial access and otherwise, may be acquired through RRC signaling. Accordingly, only SIB2 linkage is present and other DL-UL pairing need not be explicitly defined. As an example, in the 5DL:1UL structure of FIG. 30, DL CC#0 and UL CC#0 have an SIB2 linkage relationship and the remaining DL CCs may have an SIB linkage relationship with other UL CCs which are not configured for a corresponding UE.

In order to support a scenario such as that of FIG. 30, a new scheme is necessary. Hereinafter, a PUCCH format for feedback of UCI (e.g. multiple A/N bits) in a communication system supporting CA is referred to as a CA PUCCH format (or PUCCH Format 3). For example, PUCCH Format 3 is used to transmit A/N information (possibly, including DTX state) corresponding a PDSCH (or PDCCH) received from multiple DL serving cells.

FIGS. 31 to 36 illustrate the structure of PUCCH Format 3 and a signal processing operation for PUCCH Format 3.

Figure 31:
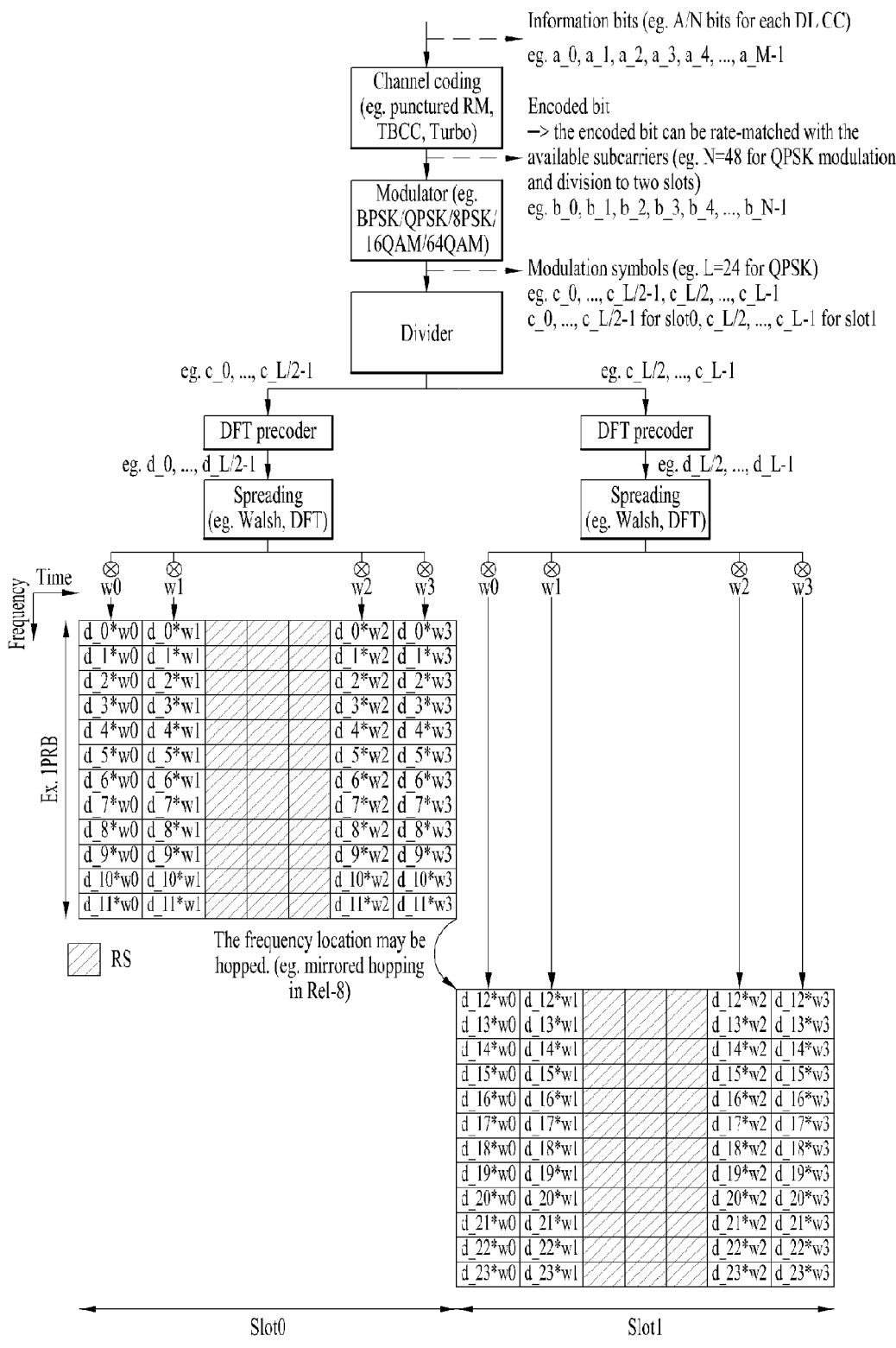

FIG. 31 shows the case where PUCCH Format 3 is applied to the structure of PUCCH Format 1 (normal CP). Referring to FIG. 31, a channel coding block channel-encodes transmission bits $a\_0, a\_1, \ldots, a\_M-1$ (e.g. multiple ACK/NACK bits) and generates coded bits (or a codeword), $b\_0, b\_1, \ldots, b\_N-1$. M is the size of transmission bits and N is the size of coded bits. The transmission bits include UCI, for example, multiple ACKs/NACKs for a plurality of data (or PDSCHs) received on a plurality of DL CCs. Herein, the transmission bits $a\_0, a\_1, \ldots, a\_M-1$ are jointly encoded irrespective of the type/number/size of UCI constituting the transmission bits. For example, if the transmission bits include multiple ACKs/NACKs for a plurality of DL CCs, channel coding is performed on the entire bit information, rather than per DL CC or per ACK/NACK bit. A single codeword is generated by channel coding. Channel coding includes, but is not limited to, repetition, simplex coding, RM coding, punctured RM coding, Tail-Biting Convolutional Coding (TBCC), Low-Density Parity-Check (LDPC) coding, or turbo coding. Although not shown, the coded bits may be rate-matched, in consideration of modulation order and the amount of resources. The rate matching function may be partially incorporated into the channel coding block or implemented in a separate functional block. For example, the channel coding block may obtain a single codeword by performing (32, 0) RM coding with respect to a plurality of control information and may perform cyclic buffer rate-matching.

A modulator generates modulation symbols $c\_0, c\_1, \ldots, c\_L-1$ by modulating the coded bits $b\_0, b\_1, \ldots, b\_M-1$. L is the size of modulation symbols. A modulation scheme is performed by changing the amplitude and phase of a transmission signal. The modulation scheme may be n-Phase Shift Keying (n-PSK) or n-Quadrature Amplitude Modulation (QAM) (where n is an integer of 2 or more). Specifically, the modulation scheme includes Binary PSB (BPSK), Quadrature (QPSK), 8-PSK, QAM, 16-QAM, or 64-QAM.

A divider divides the modulation symbols $c\_0, c\_1, \ldots, c\_L-1$ into slots. The order/pattern/scheme of dividing modulation symbols into slots is not limited to a specific one. For instance, the divider may divide the modulation symbols into slots, sequentially starting from the first modulation symbol (localized scheme). In this case, the modulation symbols $c\_0, c\_1, \ldots, c\_L/2-1$ may be allocated to slot 0 and the modulation symbols $c\_L/2, c\_L/2+1, \ldots, c\_L-1$ may be allocated to slot 1. When the modulation symbols are divided into the slots, the modulation symbols may be interleaved (or permuted). For example, even-numbered modulation symbols may be allocated to slot 0 and odd-numbered modulation symbols may be allocated to slot 1. The division process and the modulation process are interchangeable in order.

A DFT precoder performs DFT precoding (e.g. 12-point DFT) with respect to the modulation symbols divided into the slots in order to generate a single carrier waveform. Referring to FIG. 31, the modulation symbols $c\_0, c\_1, \ldots, c\_L/2-1$ allocated to slot 0 are DFT-precoded to DFT symbols $d\_0, d\_1, \ldots, d\_L/2-1$ and the modulation symbols $c\_L/2, c\_L/2+1, \ldots, c\_L-1$ allocated to slot 1 are DFT-precoded to DFT symbols $d\_L/2, d\_L/2+1, \ldots, d\_L-1$. DFT precoding may be replaced with another linear operation (e.g. Walsh precoding).

A spreading block spreads the DFT-precoded signals at an SC-FDMA symbol level (in the time domain). SC-FDMA symbol-level time-domain spreading is performed using a spreading code (sequence). The spreading code includes a quasi-orthogonal code and an orthogonal code. The quasi-orthogonal code includes, but is not limited to, a Pseudo Noise (PN) code. The orthogonal code includes, but is not limited to, a Walsh code and a DFT code. While the orthogonal code is described as a typical example of the spreading code for convenience of description, the orthogonal code may be replaced with the quasi-orthogonal code. The maximum value of a spreading code size or a Spreading Factor (SF) is limited by the number of SC-FDMA symbols used for transmitting control information. For example, if four SC-FDMA symbols are used for transmission of control information in one slot, an orthogonal code of length 4, w0, w1, w2, w3 can be used in each slot. The SF means the degree of spreading of control information and may be related to the multiplexing order or antenna multiplexing order of a UE. The SF may be changed to 1, 2, 3, 4, . . . depending on system requirements. The SF may be predefined between a BS and a UE or the BS may indicate an SF to the UE by DCI or RRC signaling. For example, if one of SC-FDMA symbols for control information is punctured to transmit an SRS, a spreading code with a decreased SF (e.g. SF=3 instead of SF=4) may be applied to the control information in a corresponding slot.

A signal generated from the above operation is mapped to subcarriers in a PRB and converted into a time-domain signal by IFFT. A CP is added to the time-domain signal and the generated SC-FDMA symbols are transmitted through an RF end.

On the assumption that ACKs/NACKs are transmitted for five DL CCs, each operation will be described in more detail. If each DL CC can transmit two PDSCHs, ACK/NACK bits for the PDSCHs may be 12 bits, including a DTX state. Under the assumption of QPSK and time spreading of SF=4, the size of a coding block (after rate matching) may be 48 bits. The coded bits are modulated to 24 QPSK symbols and the QPSK symbols are divided into two slots each including 12 QPSK symbols. The 12 QPSK symbols in each slot are converted into 12 DFT symbols by 12-point DFT. The 12 DFT symbols in each slot are spread to four SC-FDMA symbols using a spreading code of SF=4 in the time domain and then mapped. Since 12 bits are transmitted on [2 bits×12 subcarriers×8 SC-FDMA symbols], the coding rate is 0.0625 (=12/192). If SF=4, a maximum of four UEs may be multiplexed per PRB.

The signal processing operation described with reference to FIG. 31 is only exemplary and the signal mapped to the PRB in FIG. 31 may be obtained using various equivalent signal processing operations. The signal processing operations equivalent to FIG. 31 will be described with reference to FIGS. 32 to 36.

Figure 32:
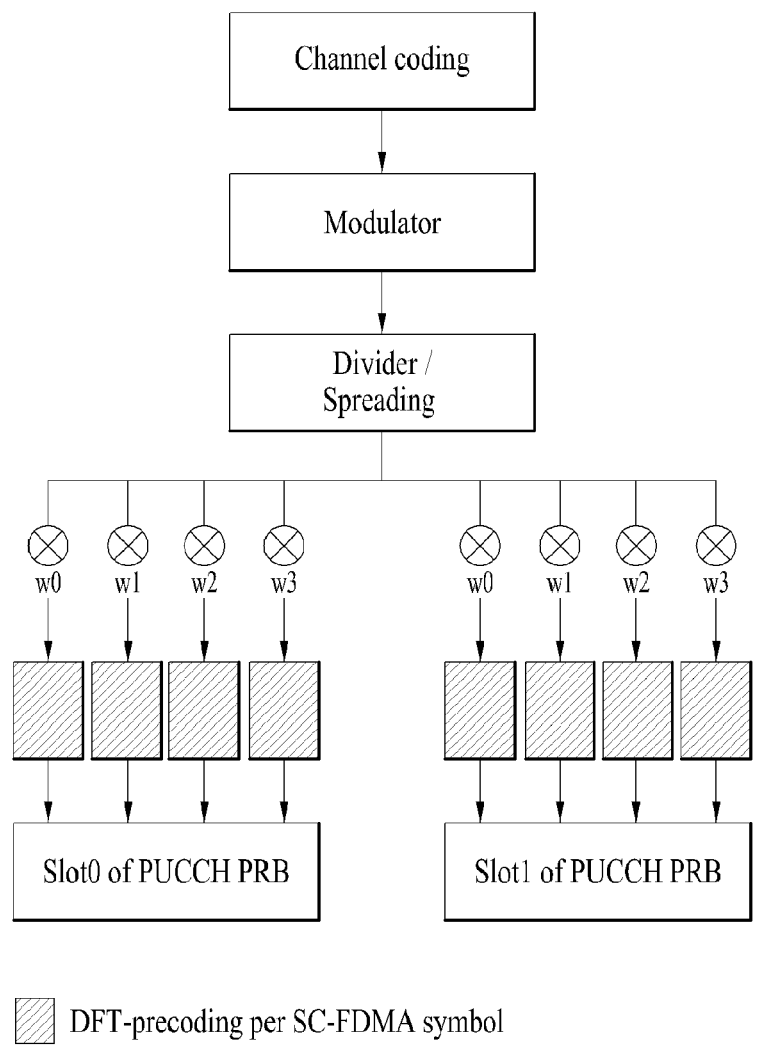

FIG. 32 is different from FIG. 31 in the order of the DFT precoder and the spreading block. In FIG. 31, since the function of the spreading block is equal to multiplication of a DFT symbol sequence output from the DFT precoder by a specific constant at an SC-FDMA symbol level, the value of the signal mapped to the SC-FDMA symbols is constant even when the order of the DFT precoder and the spreading block is changed. Accordingly, the signal processing operation for PUCCH Format 3 may be performed in order of channel coding, modulation, division, spreading and DFT precoding. In this case, the division process and the spreading process may be performed by one functional block. For example, the modulation symbols may be spread at the SC-FDMA symbol level while being alternately divided to slots. As another example, the modulation symbols are copied to suit the size of the spreading code when the modulation symbols are divided to slots, and the modulation symbols and the elements of the spreading code may be multiplied in one-to-one correspondence. Accordingly, the modulation symbol sequence generated in each slot is spread to a plurality of SC-FDMA symbols at the SC-FDMA symbol level. Thereafter, the complex symbol sequence corresponding to each SC-FDMA symbol is DFT-precoded in SC-FDMA symbol units.

Figure 33:
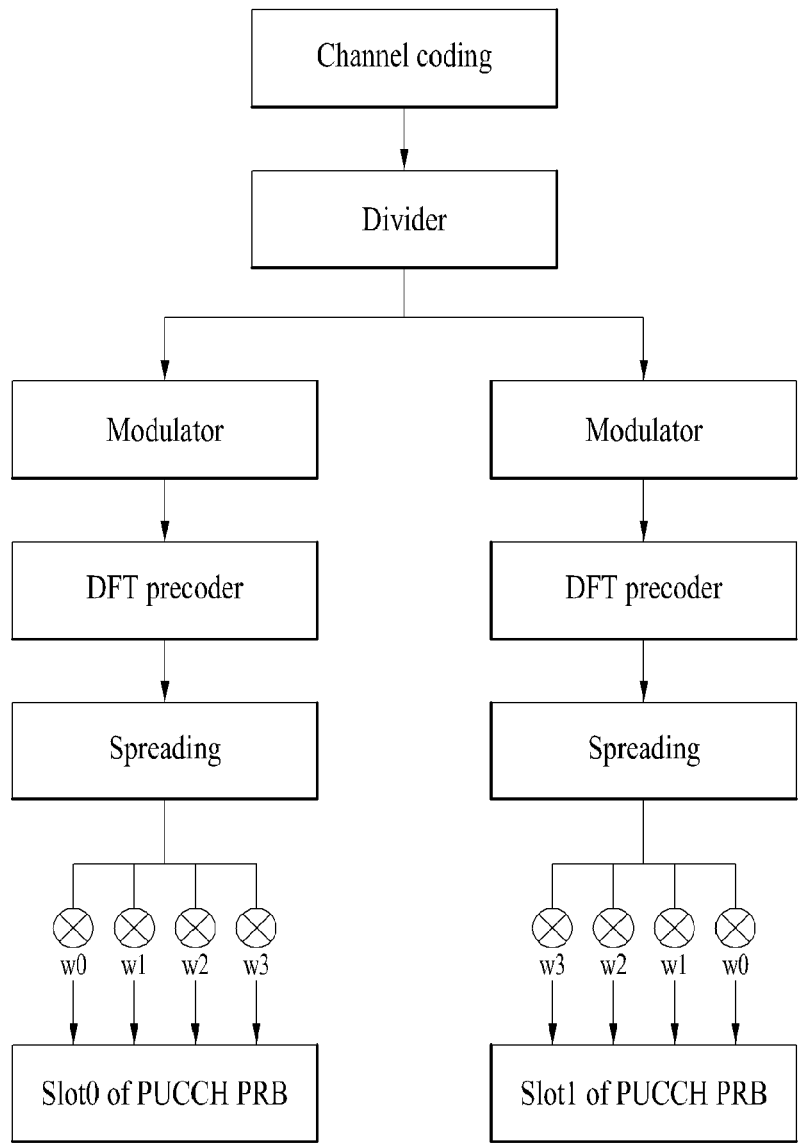

FIG. 33 is different from FIG. 31 in the order of the modulator and the divider. Accordingly, the signal processing operation for PUCCH Format 3 may be performed in order of joint channel coding and division at a subframe level and modulation, DFT precoding and spreading at each slot level.

Figure 34:
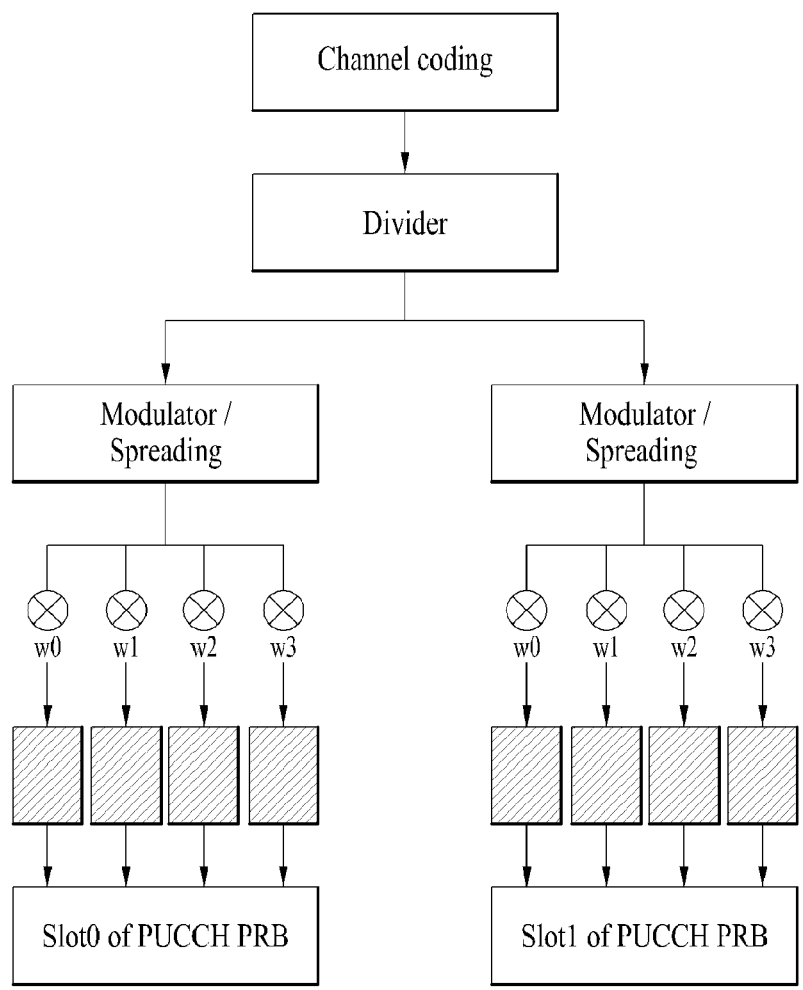

FIG. 34 is different from FIG. 33 in order of the DFT precoder and the spreading block. As described above, since the function of the spreading block is equal to multiplication of a DFT symbol sequence output from the DFT precoder by a specific constant at an SC-FDMA symbol level, the value of the signal mapped to the SC-FDMA symbols is constant even when the order of the DFT precoder and the spreading block is changed. Accordingly, the signal processing operation for PUCCH Format 3 may be performed by joint channel coding and division at a subframe level and modulation at each slot level. The modulation symbol sequence generated in each slot is spread to a plurality of SC-FDMA symbols at the SC-FDMA symbol level and the modulation symbol sequence corresponding to each SC-FDMA symbol is DFT-precoded in SC-FDMA symbol units. In this case, the modulation process and the spreading process may be performed by one functional block. For example, the generated modulation symbols may be directly spread at the SC-FDMA symbol level while the encoded bits are modulated. As another example, the modulation symbols are copied to suit the size of the spreading code when the encoded bits are modulated, and the modulation symbols and the elements of the spreading code may be multiplied in one-to-one correspondence.

Figure 35:
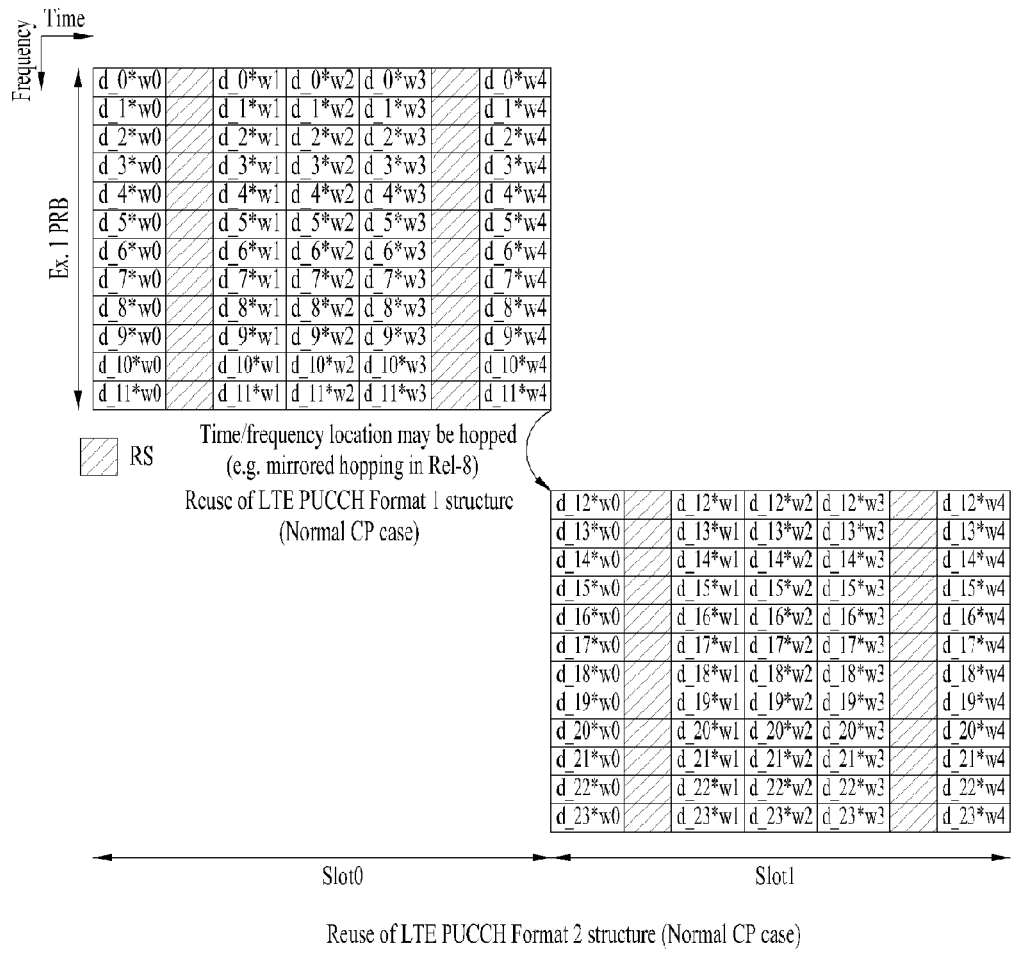
Figure 36:
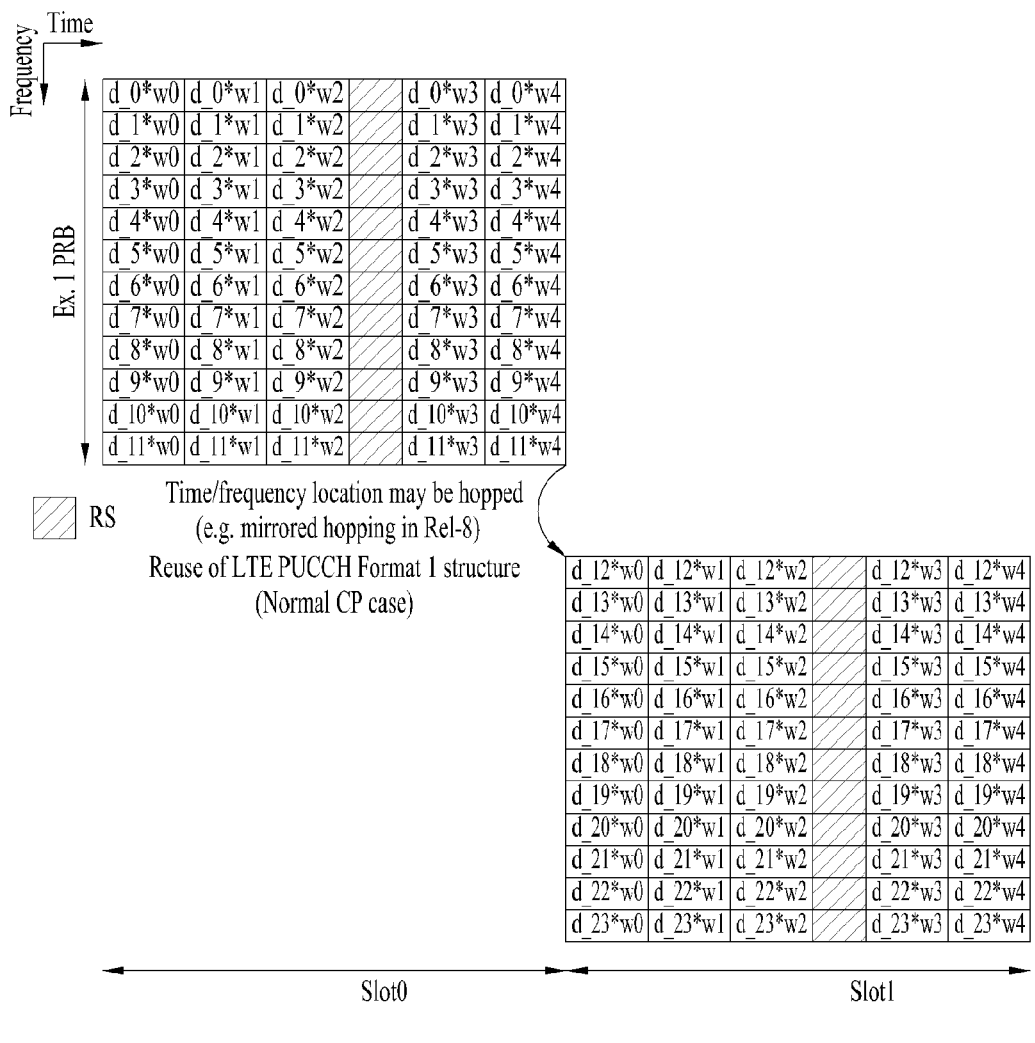

FIG. 35 shows the case where PUCCH Format 3 is applied to the structure of PUCCH Format 2 (normal CP) and FIG. 36 shows the case where PUCCH Format 3 is applied to the structure of PUCCH Format 2 (extended CP). The basic signal processing operation is equal to those described with respect to FIGS. 31 to 34. As the structure of PUCCH Format 2 of the legacy LTE is reused, the number/locations of UCI SC-FDMA symbols and RS SC-FDMA symbols in PUCCH Format 3 is different from that of FIG. 31.

Table 14 shows the location of the RS SC-FDMA symbol in PUCCH Format 3. It is assumed that the number of SC-FDMA symbols in a slot is 7 (indexes 0 to 6) in the normal CP case and the number of SC-FDMA symbols in a slot is 6 (indexes 0 to 5) in the extended CP case.

TABLE 14

| | SC-FDMA symbol location of RS | |
| --- | --- | --- |
| | Normal CP | Extended CP | Note |
| PUCCH Format 3 | 2, 3, 4 | 2, 3 | Reuse of PUCCH Format 1 |
| | 1, 5 | 3 | Reuse of PUCCH Format 2 |

Here, the RS may reuse the structure of the legacy LTE. For example, an RS sequence may be defined using cyclic shift of a base sequence (see Equation 1).

In the meantime, the multiplexing capacity of a data part is 5 due to SF=5. However, the multiplexing capacity of an RS part is determined by a CS interval $\Delta_{shift}^{PUCCH}$. For example, the multiplexing capacity may be $12/\Delta_{shift}^{PUCCH}$. In this case, the multiplexing capacities for the cases in which $\Delta_{shift}^{PUCCH}=1$, $\Delta_{shift}^{PUCCH}=2$, and $\Delta_{shift}^{PUCCH}=3$ are 12, 6, and 4, respectively. In FIGS. 35 and 36, while the multiplexing capacity of the data part is 5 due to SF=5, the multiplexing capacity of the RS part is 4 in case of $\Delta_{shift}^{PUCCH}$. Therefore, an overall multiplexing capacity may be limited to the smaller of the two values, 4.

FIG. 37 illustrates an exemplary structure of PUCCH Format 3 in which a multiplexing capacity is increased. Referring to FIG. 37, SC-FDMA symbol-level spreading in a slot is applied to an RS part. Then, the multiplexing capacity of the RS part is doubled. That is, the multiplexing capacity of the RS part is 8 even in case of $\Delta_{shift}^{PUCCH}=3$, thereby preventing the multiplexing capacity of a UCI data part from being reduced. An OCC for RSs may include, without being limited to, a Walsh cover of [y1 y2]=[1 1] or [1 −1] or linear transformation thereof (e.g. [j j] [j −j], [1 j] [1 −j], etc.). y1 is applied to the first RS SC-FDMA symbol of a slot and y2 is applied to the second RS SC-FDMA symbol of a slot.

FIG. 38 illustrates another structure of PUCCH Format 3 in which multiplexing capacity is increased. If slot-level frequency hopping is not performed, the multiplexing capacity may be doubled again by further applying spreading or covering (e.g. Walsh covering) in slot units. If slot-level frequency hopping is performed, application of Walsh covering in slot units may not maintain orthogonality due to a channel condition experienced in each slot. A slot-level spreading code (e.g. OCC) for RSs may include, without being limited to, a Walsh cover of [x1 x2]=[1 1] or [1 −1] or linear transformation thereof (e.g. [j j],[j −j], [1 j] [1−j], etc.). x1 is applied to the first slot and x2 is applied to the second slot. While FIG. 38 shows SC-FDMA symbol-level spreading (or covering) after slot-level spreading (or covering), a spreading (or covering) order may be changed.

The signal processing procedure of PUCCH Format 3 will now be described using equations. For convenience, it is assumed that a length-5 OCC is used (e.g. FIGS. 34 to 38).

The block of bits b(0), . . . , b($M_{bit}$−1) is scrambled with a UE-specific scrambling sequence. The block of bits b(0), . . . , b($M_{bit}$−1) may be corresponding to coded bits b_0, b_1, . . . , b_N−1 of FIG. 31. The block of bits b(0), . . . , b($M_{bit}$−1) includes at least one of ACK/NACK bit, CSI bit, SR bit. A block of scrambled bits $\tilde{b}$(0), . . . , $\tilde{b}$($M_{bit}$−1) may be generated by the equation below.

$$\tilde{b}(i)=(b(i)+c(i))\bmod 2 \quad \text{[Equation 10]}$$

where c(i) denotes the scrambling sequence. c(i) includes pseudo-random sequences are defined by a length-31 Gold sequence and may be generated by the following equation where mod denotes the modulo operation.

$$c(n)=(x_1(n+N_C)+x_2(n+N_C))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2 \quad \text{[Equation 11]}$$

where $N_C$=1600 and the first m-sequence is initialized with $x_1$(0)=1, $x_1$(n)=0, n=1, 2, . . . , 30. The initialization of the second m-sequence is given by $c_{init}=\Sigma_{i=0}^{30}x_2(i)\cdot 2^i$. $c_{init}$ may be initialized with $c_{init}=(\lfloor n_s/2 \rfloor+1)\cdot(2N_{ID}^{cell}+1)\cdot 2^{16}+n_{RNTI}$ at the start of each subframe. $n_s$ is a slot number within a radio frame. $N_{ID}^{cell}$ is physical layer cell identity. $n_{RNTI}$ is radio network temporary identifier.

The block of scrambled bits $\tilde{b}$(0), . . . , $\tilde{b}$($M_{bit}$−1) is modulated, resulting in a block of complex-valued modulation symbols d(0), . . . , d($M_{symb}$−1). When QPSK modulated, $M_{symb}=M_{bit}/2=2N_{sc}^{RB}$. The block of complex-valued modulation symbols d(0), . . . , d($M_{symb}$−1) is corresponding to modulation symbol c_0, c_1, . . . , c_N−1 at FIG. 31.

The complex-valued modulation symbols d(0), . . . , d($M_{symb}$−1) are block-wise spread with the orthogonal sequence $w_{n_{oc}}(i)$ resulting in $N_{SF,0}^{PUCCH}+N_{SF,1}^{PUCCH}$ sets of complex-valued symbols according to the following equation. The divide/spread procedure of FIG. 32 is performed by the following equation. Each complex-valued symbol is corresponding to an SC-FDMA symbol, and has $N_{sc}^{RB}$ complex-valued modulation values (e.g. 12 complex-valued modulation values).

$$y_n(i) = \begin{cases} w_{n_{oc},0}(\bar{n}) \cdot e^{j\pi \lfloor n_{cs}^{cell}(n_s,l)/64 \rfloor/2} \cdot d(i) & n < N_{SF,0}^{PUCCH} \\ w_{n_{oc},1}(\bar{n}) \cdot e^{j\pi \lfloor n_{cs}^{cell}(n_s,l)/64 \rfloor/2} \cdot & \\ \quad d(N_{sc}^{RB} + i) & \text{otherwise} \end{cases} \quad \text{[Equation 12]}$$

$$\bar{n} = n \bmod N_{SF,0}^{PUCCH}$$

$$n = 0, \ldots, N_{SF,0}^{PUCCH} + N_{SF,1}^{PUCCH} - 1$$

$$i = 0, 1, \ldots, N_{sc}^{RB} - 1$$

Here, $N_{SF,0}^{PUCCH}$ and $N_{SF,1}^{PUCCH}$ correspond to the number of SC-FDMA symbols used for PUCCH transmission at slot 0 and slot 1, respectively. $N_{SF,0}^{PUCCH}=N_{SF,1}^{PUCCH}=5$ for both slots in a subframe using normal PUCCH format 3 and $N_{SF,0}^{PUCCH}=5$, $N_{SF,1}^{PUCCH}=4$ holds for the first and second slot, respectively, in a subframe using shortened PUCCH format 3. $w_{n_{oc},0}(i)$ and $w_{n_{oc},1}(i)$ indicate orthogonal sequences applied to slot 0 and slot 1, respectively and are given by Table 15 shown below. $n_{oc}$ denotes an orthogonal sequence index (or an orthogonal code index). $\lfloor \ \rfloor$ denotes a flooring function. $n_{cs}^{cell}(n_s,l)$ may be given by $n_{cs}^{cell}(n,l)=\Sigma_{i=0}^{7}c(8N_{symb}^{UL}\cdot n_s+8l+i)\cdot 2^i$. $c(i)$ may be given by Equation 11 and may be initialized to $c_{init}=N_{ID}^{cell}$ at the beginning of every radio frame.

Table 15 shows a sequence index $n_{oc}$ and an orthogonal sequence $w_{n_{oc}}(i)$.

TABLE 15

| Sequence index | Orthogonal sequence $[w_{n_{oc}}(0) \ldots w_{n_{oc}}(N_{SF}^{PUCCH}-1)]$ | |
| --- | --- | --- |
| $n_{oc}$ | $N_{SF}^{PUCCH}=5$ | $N_{SF}^{PUCCH}=4$ |
| 0 | [1 1 1 1 1] | [+1 +1 +1 +1] |
| 1 | [1 $e^{j2\pi/5}$ $e^{j4\pi/5}$ $e^{j6\pi/5}$ $e^{j8\pi/5}$] | [+1 −1 +1 −1] |
| 2 | [1 $e^{j4\pi/5}$ $e^{j8\pi/5}$ $e^{j2\pi/5}$ $e^{j6\pi/5}$] | [+1 +1 −1 −1] |
| 3 | [1 $e^{j6\pi/5}$ $e^{j2\pi/5}$ $e^{j8\pi/5}$ $e^{j4\pi/5}$] | [+1 −1 −1 +1] |
| 4 | [1 $e^{j8\pi/5}$ $e^{j6\pi/5}$ $e^{j4\pi/5}$ $e^{j2\pi/5}$] | — |

In Table 15, an orthogonal sequence (or code) of $N_{SF}^{PUCCH}=5$ is generated by the following equation.

$$\left[ e^{j\frac{2\pi \cdot 0 \cdot n_{oc}}{5}} \ e^{j\frac{2\pi \cdot 1 \cdot n_{oc}}{5}} \ e^{j\frac{2\pi \cdot 2 \cdot n_{oc}}{5}} \ e^{j\frac{2\pi \cdot 3 \cdot n_{oc}}{5}} \ e^{j\frac{2\pi \cdot 4 \cdot n_{oc}}{5}} \right] \quad \text{[Equations 13]}$$

Resources used for transmission of PUCCH formats 3 are identified by a resource index $n_{PUCCH}^{(3)}$. For example, $n_{oc}$ may be given by $n_{oc}=n_{PUCCH}^{(3)} \bmod N_{SF,1}^{PUCCH}$. $n_{PUCCH}^{(3)}$ may be indicated through a Transmit Power Control (TPC) field of an SCell PDCCH. More specifically, $n_{oc}$ for each slot may be given the following equation.

$$n_{oc,0}=n_{PUCCH}^{(3)} \bmod N_{SF,1}^{PUCCH} \quad \text{[Equation 14]}$$

$$n_{oc,1}\begin{cases}(3n_{oc,0})\bmod N_{SF,1}^{PUCCH} & \text{if } N_{SF,1}^{PUCCH}=5 \\ n_{oc,0}\bmod N_{SF,1}^{PUCCH} & \text{otherwise}\end{cases}$$

where $n_{oc,0}$ denotes a sequence index value $n_{oc}$ for slot 0 and $n_{oc,1}$ denotes a sequence index value $n_{oc}$ for slot 1. In case of normal PUCCH Format 3, $N_{SF,0}^{PUCCH}=N_{SF,1}^{PUCCH}=5$. In case of shortened PUCCH Format 3, $N_{SF,0}^{PUCCH}=5$ and $N_{SF,1}^{PUCCH}=4$.

Each set of complex-valued symbols may be cyclically shifted according to $$\tilde{y}_n(i)=y_n((i+n_{cs}^{cell}(n_s,l))\bmod N_{sc}^{RB}) \quad \text{[Equation 15]}$$

where $n_s$ denotes a slot number in a radio frame and l denotes an SC-FDMA symbol number in a slot. $n_{cs}^{cell}(n_s,l)$ is defined by Equation 12. $m=0,\ldots,N_{SF,0}^{PUCCH}+N_{SF,1}^{PUCCH}-1$.

The shifted sets of complex-valued symbols are transform precoded according to the following equation, resulting a block of complex-valued symbols $z(0),\ldots,z((N_{SF,0}^{PUCCH}+N_{SF,1}^{PUCCH})N_{sc}^{RB}-1)$.

$$z(n \cdot N_{sc}^{RB}+k)=\frac{1}{\sqrt{P}}\frac{1}{\sqrt{N_{sc}^{RB}}}\sum_{i=0}^{N_{sc}^{RB}-1}\tilde{y}_n(i)e^{-j\frac{2\pi ik}{N_{sc}^{RB}}} \quad \text{[Equation 16]}$$

$$k=0,\ldots,N_{sc}^{RB}-1$$

$$n=0,\ldots,N_{SF,0}^{PUCCH}+N_{SF,1}^{PUCCH}-1$$

Complex symbol blocks $z(0),\ldots,z((N_{SF,0}^{PUCCH}+N_{SF,1}^{PUCCH})N_{sc}^{RB}-1)$ are mapped to physical resources after power control. A PUCCH uses one resource block in each slot of a subframe. In the resource block, $z(0),\ldots,z((N_{SF,0}^{PUCCH}+N_{SF,1}^{PUCCH})N_{sc}^{RB}-1)$ are mapped to a resource element (k,l) which is not used for RS transmission (see Table 14). Mapping is performed in ascending order of k, l, and a slot number, starting from the first slot of a subframe. k denotes a subcarrier index and l denotes an SC-FDMA symbol index in a slot.

Hereinafter, a process of performing channel coding using PUCCH Format 3 will be described in more detail. As described above, the transmission bits $a\_0, a\_1, \ldots, a\_M-1$ are jointly encoded irrespective of the type/number/size of UCI constituting the transmission bits. In order to transmit UCI using PUCCH Format 3, three channels coding types may be used: channel coding for transmission of CQI/PMI; channel coding for simultaneous transmission of ACK/NACK and SR; and channel coding for simultaneous transmission of CQI/PMI and ACK/NACK. As described above, channel coding includes, but is not limited to, repetition, simplex coding, RM coding, punctured RM coding, Tail-Biting Convolutional Coding (TBCC), Low-Density Parity-Check (LDPC) coding, or turbo coding. However, channel coding will be described in terms of RM coding.

When a subframe for transmission of ACK/NACK and a subframe for transmission of SR are the same, that is, when ACK/NACK and SR are simultaneously transmitted, ACK/NACK information bits and SR information bit (1 bit) may be jointly encoded in the corresponding subframe. In this case, the SR information bit may be added to a start side or end side of the ACK/NACK information bits. For example, when the ACK/NACK information bits is $a\_0, a\_1, \ldots, a\_N-1$ (N<=10) and the SR information bit is n_SR (when scheduling request is present, n_SR has 1, and when scheduling request is not present, n_SR has 0), joint encoding may be performed to have $a\_0, a\_1, \ldots, a\_N-1$, n_SR.

With regard to RM coding applied to PUCCH Format 3 coding, the total number of information bits is limited to 11. In this regard, when the number of information bits exceeds 11, Dual RM coding is performed. Hereinafter, Dual RM coding will be briefly described.

FIG. 39 is a block diagram for explaining Dual RM coding to which the present invention is applied. Referring to FIG. 39, information bits (e.g., ACK/NACK, SR, and RI) of UCI are divided into two segments. When the size of information bit is N, bits corresponding to a rounded-up value of N/2 are divided into a segment 1, and bits except for the bits divided into segments N to 1 are divided into a segment 2. For example, when N=15, 8 bits are divided into the segment 1 and 7 bits are divided into the segment 2. When RM coding of (32,0) is performed in each segment, 32 coding bits (a total of 64 bits) are generated in each segment. When it is assumed that QPSK modulation is used, the number of subcarriers (previous stages of DFT) mapped to a symbol, which is encoded to a slot 0 and a slot 1 and then is encoded, is 24, and thus, a total of 48 coding bits need to be calculated. Thus, in order to rate match 32 bits generated by each of the segment 1 and the segment 2 to 24 bits, the last 8 bits are discarded. The generated coding bit is interleaving mapped (for example, the segment 1 is mapped to an odd index and the segment 2 is mapped to an even index), is converted into a DFT symbol via DFT calculation, and is transmitted through an IFFT. Dual RM coding is almost the same as RM coding, except that information bit is divided before coded.

In this case, when information bits of various types of UCI are jointly encoded, a division method for Dual RM coding needs to be defined. Hereinafter, a process of joint encoding of various information bits will be described with reference to FIGS. 40 to 45. For convenience of description, joint encoding between ACK/NACK information bits and SR information bit is exemplified. However, it will be understood that the present invention is not limited thereto.

FIG. 40 illustrates a joint encoding method according to a first embodiment of the present invention. Referring to FIG. 40, ACK/NACK information bits may be divided into the segment 1 and the segment 2, an SR information bit may be added to ACK/NACK information bit of the segment 2, and then, channel coding may be performed on each segment. In this case, the SR information bit may be positioned in a front or end of the ACK/NACK information bits of the segment 2. When the number of ACK/NACK information bits divided into two segments is not identical (when N is an odd number), it is advantageous for maintaining the number of information bits included in each segment by adding SR information bit. For example, when N=15, ACK/NACK information bit of 8 bits is divided into the segment 1, and ACK/NACK information bit of 7 bits is divided into the segment 2. In this case, since the SR information bit (1 bit) is added to the segment 2, information bit in each segment may have 8 bit to maintain balance.

FIG. 41 illustrates a joint encoding method according to a second embodiment of the present invention. Referring to FIG. 41, ACK/NACK information bits may be divided into a segment 1 and a segment 2, an SR information bit may be added to the ACK/NACK information bits of the segment 1, and then, channel coding may be performed on each segment. In this case, the SR information bit may be positioned in a start or end of the ACK/NACK information bits of the segment 1.

FIG. 42 illustrates a joint encoding method according to a third embodiment of the present invention. Referring to FIG. 42, an SR information bit may be channel-coded to generate 2×m (where m is an arbitrary integer) bits, the 2×m bits may be equally divided into opposite segments (a segment 1 and a segment 2). In this case, the channel coding of the SR information bit corresponds to repetition coding. The repetition coding may be advantageous when the same number of ACK/NACK information bits is present in opposite segments. For example, when N=14, ACK/NACK information bits of 7 bits may be divided into the segment 1 and the segment 2, respectively. In this case, the SR information bit of 1 bit may be extended to 2 bits via repetition coding, and 1 bit of the extended SR information bits may be added to each of the segment 1 and the segment 2 to have 8 bits of information bit (a total of 16 bits of information bits), maintaining balance between segments.

FIG. 43 illustrates a joint encoding method according to a fourth embodiment of the present invention. Referring to FIG. 43, before ACK/NACK information bits are divided into each segment, an SR information bit (1 bit) may be added to a front or rear of ACK/NACK information bits. Since the number of information bits is simply increased by 1 bit, a specific process does not have to be performed, and thus, the joint encoding method may be advantageous from a system complexity point of view.

A joint encoding method according to a fifth embodiment of the present invention may be implemented by combination of the first and third embodiments or combination of the second and third embodiments. That is, when N is an odd number (when the number of ACK/NACK information bits is an odd number), the first embodiment may be applied, and when N is an even number, the third embodiment may be applied. Alternatively, when N is an odd number, the second embodiment may be applied, and when N is an even number, the third embodiment may be applied.

FIGS. 44 and 45 illustrate a joint encoding method according to a sixth embodiment of the present invention. According to a position at which an SR information bit is added before ACK/NACK information bits are divided, a division method differs.

Referring to FIG. 44, when an SR information bit is added to a previous phase of ACK/NACK information bits before ACK/NACK information bits are divided into each segment (n_SR, a_0, . . . , a_N−1), if the SR information bit and the ACK/NACK information bits have a total size of M=N+1 (N is a total number of ACK/NACK information bits), bits corresponding to a rounded-up value of M/2 are divided into a segment 1, and bits except for the bits divided into segments M to 1 are divided into a segment 2. That is, when M is an odd number, the number of bits divided into the segment 1 is 1 greater than the number of bits divided into the segment 2. Since the SR information bit is positioned at the head, the ACK/NACK information bits divided into opposite segments are identical or different by 1.

Referring to FIG. 45, when the SR information is added to a rear of the ACK/NACK information bits before the ACK/NACK information bits are divided into each segment (a_0, . . . , a_N−1, n_SR), if the SR information bit and the ACK/NACK information bits have a total size of M=N+1 (N is a total number of ACK/NACK information bits), bits obtained by excluding a rounded-up value of M/2 from M are divided into the segment 1, and bits corresponding to a rounded-up value of M/2 are divided into the segment 2. That is, when M is an odd number, the number of bits divided into the segment 2 is 1 greater than the number of bits divided into the segment 1. Since the SR information bit is positioned at the end, the ACK/NACK information bits divided into opposite segments are identical or different by 1.

A joint encoding method according to a seventh embodiment of the present invention may be performed by varying a division method according to whether an SR subframe is present. That is, when an SR information bit is not transmitted, a bit corresponding to a rounded-up value of N/2 (N is a total number of ACK/NACK information bits) is divided into a segment 1, and a bit obtained by excluding a rounded-up value of N/2 from N is divided into the segment 2. When the SR information bit is transmitted (when the SR subframe is present), the SR information bit is added to a previous or next stage of the ACK/NACK information bits, a bit corresponding to a rounded-up value of M/2 (M=N+1, and N is a total number of ACK/NACK information bits) is divided into the segment 1, and a bit obtained by excluding a rounded-up value of M/2 from M is divided into the segment 2.

FIG. 46 illustrates a BS and a UE that are applicable to an exemplary embodiment of the present invention. If a relay is included in a wireless communication system, communication on backhaul link is performed between the BS and the relay and communication on access link is performed between the relay and the UE. Accordingly, the BS or the UE shown in the figure may be replaced with a relay according to circumstance.

Referring to FIG. 46, a wireless communication system includes a BS 110 and a UE 120. The BS 110 includes a processor 112, a memory 114, and a Radio Frequency (RF) unit 116. The processor 112 may be configured to carry out the procedures and/or methods proposed in the present invention. The memory 114 is connected to the processor 112 and stores various information related to the operation of the processor 112. The RF unit 116 is connected to the processor 112 and transmits and/or receives RF signals. The UE 120 includes a processor 122, a memory 124, and an RF unit 126. The processor 122 may be configured to carry out the procedures and/or methods proposed in the present invention. The memory 124 is connected to the processor 122 and stores various information related to the operation of the processor 122. The RF unit 126 is connected to the processor 122 and transmits and/or receives RF signals. The BS 110 and/or the UE may have a single antenna or multiple antennas.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, a description is mainly given, centering on a data transmission and reception relationship among a BS and a UE. Such a data transmission and reception relationship is extended to data transmission and reception between a UE and a relay or between a BS and a relay in the same or similar manner. In some cases, a specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term IBS' may be replaced with the terms fixed station, Node B, eNode B (eNB), access point, etc. The term 'UE' may be replaced with the terms MS, Mobile Subscriber Station (MSS), etc. The term 'relay' may be replaced with the terms Relay Node (RN), relay station, repeater, etc.

The embodiments of the present invention may be achieved by various means, for example, hardware, firmware, software, or a combination thereof. In a hardware configuration, an embodiment of the present invention may be achieved by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The present invention is applicable to a UE, BS, or other devices of a wireless mobile communication system. Specifically, the present invention is applicable to a method for transmitting uplink control information and an apparatus therefor.

The invention claimed is:

1. A method of transmitting control information comprising a plurality of positive/negative acknowledgements (ACK/NACKs) and a scheduling request (SR) by a User Equipment (UE) in a wireless communication system, the method comprising:
   receiving a plurality of Physical Downlink Shared Channels (PDSCHs); and
   transmitting a plurality of ACK/NACKs and an SR corresponding to the plurality of PDSCHs using Physical Uplink Control Channel (PUCCH) Format 3,
   wherein the plurality of ACK/NACKs are divided into first and second segments, and the SR is added to an end of the second segment and jointly encoded with plural ACK/NACKs of the second segment to which the SR is added,
   wherein the SR is added to the end of the second segment when N is an odd number, wherein repetition coding is performed on the SR to generate 2×m SRs, where m is an arbitrary integer,
   wherein the generated SRs are equally divided into and added to the first and second segments when N is an even number, and
   wherein N is a number of the plurality of ACK/NACKs.

2. The method according to claim 1, wherein a number of ACK/NACKs corresponding to a rounded-up value of N/2 are divided into the first segment, and the number of ACK/NACKs, obtained by excluding the number of ACK/NACKs divided into the first segment from N, are divided into the second segment, when the number of the plurality of ACK/NACKs is N.

3. The method according to claim 1, wherein a number of the plurality of ACK/NACKs exceeds 11.

4. The method according to claim 1, wherein the encoding corresponds to dual Reed-Muller (RM) coding.

5. An apparatus for transmitting control information comprising a plurality of positive/negative acknowledgements (ACK/NACKs) and a scheduling request (SR) in a wireless communication system, the apparatus comprising:
- a Radio Frequency (RF) unit; and
- a processor for controlling the RF unit to receive a plurality of Physical Downlink Shared Channels (PDSCHs) and to transmit a plurality of ACK/NACKs and an SR corresponding to the plurality of PDSCHs using Physical Uplink Control Channel (PUCCH) Format 3, wherein the plurality of ACK/NACKs are divided into first and second segments, and the SR is added to an end of the second segment and jointly encoded with plural ACK/NACKs of the second segment to which the SR is added, wherein the SR is added to the end of the second segment when N is an odd number, wherein repetition coding is performed on the SR to generate 2×m SRs, where m is an arbitrary integer, wherein the generated SRs are equally divided into and added to the first and second segments when N is an even number, and wherein N is a number of the plurality of ACK/NACKs.

6. The apparatus according to claim 5, wherein a number of ACK/NACKs corresponding to a rounded-up value of N/2 are divided into the first segment, and the number of ACK/NACKS, obtained by excluding the number of ACK/NACKs divided into the first segment from N, are divided into the second segment, when the number of the plurality of ACK/NACKs is N.

7. The apparatus according to claim 5, wherein a number of the plurality of ACK/NACKs exceeds 11.

8. The apparatus according to claim 5, wherein the encoding corresponds to dual Reed-Muller (RM) coding.

* * * * *